United States Patent
Nishimura et al.

(10) Patent No.: US 11,788,179 B2
(45) Date of Patent: Oct. 17, 2023

(54) METHOD FOR MANUFACTURING A GAS WIPING NOZZLE

(71) Applicant: NIPPON STEEL CORPORATION, Tokyo (JP)

(72) Inventors: Tetsuya Nishimura, Tokyo (JP); Takashi Oke, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 894 days.

(21) Appl. No.: 16/636,862

(22) PCT Filed: Sep. 20, 2018

(86) PCT No.: PCT/JP2018/034814
§ 371 (c)(1),
(2) Date: Feb. 5, 2020

(87) PCT Pub. No.: WO2019/065453
PCT Pub. Date: Apr. 4, 2019

(65) Prior Publication Data
US 2020/0171513 A1    Jun. 4, 2020

(30) Foreign Application Priority Data

Sep. 29, 2017 (JP) .................................. 2017-189614

(51) Int. Cl.
*B23P 15/00*      (2006.01)
*C23C 2/40*       (2006.01)
(Continued)

(52) U.S. Cl.
CPC .............. *C23C 2/40* (2013.01); *B23P 15/00* (2013.01); *B05B 1/04* (2013.01); *C23C 2/18* (2013.01); *Y10T 29/49432* (2015.01)

(58) Field of Classification Search
CPC ........................... B23P 15/00; Y10T 29/49432
See application file for complete search history.

(56) References Cited

U.S. PATENT DOCUMENTS 8,113,139 B2 * 2/2012 Kim ........................ C23C 2/20
                                                     118/62
8,429,834 B2 * 4/2013 Fujioka .................... C23C 2/20
                                                     34/631
(Continued)

FOREIGN PATENT DOCUMENTS

JP        63-34161 U       3/1988
JP        64-51660 U       3/1989
(Continued)

OTHER PUBLICATIONS

International Preliminary Report on Patentability and English translation of the Written Opinion of the International Searching Authority (Forms PCT/IB/326, PCT/IB/373, and PCT/ISA/237) for International Application No. PCT/JP2018/034814, dated Apr. 9, 2020.
(Continued)

*Primary Examiner* — Sarang Afzali
(74) *Attorney, Agent, or Firm* — Birch, Stewart, Kolasch & Birch, LLP

(57) ABSTRACT

A method for manufacturing a gas wiping nozzle provided with a pair of lip parts facing each other and a slit formed as a gas ejection port between the pair of lip parts and blowing gas from the slit against a steel strip pulled up from a plating bath to adjust a thickness of a molten metal film deposited on a surface of the steel strip, which method includes fitting fitting projections provided at one lip part with fitting holes provided at another slip part and fastening the pair of lip parts together in the fitted state, the fitting projections fitted with the fitting holes, two pairs of the fitting projections and the fitting holes provided separated by a distance in a width direction of the steel strip, relative movement between the pair of lip parts in a thickness direction of the steel strip restricted in the fitted state.

7 Claims, 16 Drawing Sheets

(51) Int. Cl.
   *B05B 1/04*   (2006.01)
   *C23C 2/18*   (2006.01)

(56) References Cited

U.S. PATENT DOCUMENTS

| | | | |
|---|---|---|---|
| 9,085,003 B2 * | 7/2015 | Dodson | ........... B05B 1/044 |
| 2009/0114149 A1 | 5/2009 | Lee et al. | |

FOREIGN PATENT DOCUMENTS

| | | | | |
|---|---|---|---|---|
| JP | 6-25355 U | | 4/1994 | |
| JP | 09279322 A | * | 10/1997 | |
| JP | 11-217661 A | | 8/1999 | |
| JP | 2007270161 A | * | 10/2007 | |
| JP | 2009-540121 A | | 11/2009 | |
| JP | 2014-167148 A | | 9/2014 | |
| WO | WO-2007142396 A1 | * | 12/2007 | ............. C23C 2/003 |

OTHER PUBLICATIONS

International Search Report (Form PCT/ISA/210) for International Application No. PCT/JP2018/034814, dated Nov. 13, 2018, with English translation.

\* cited by examiner

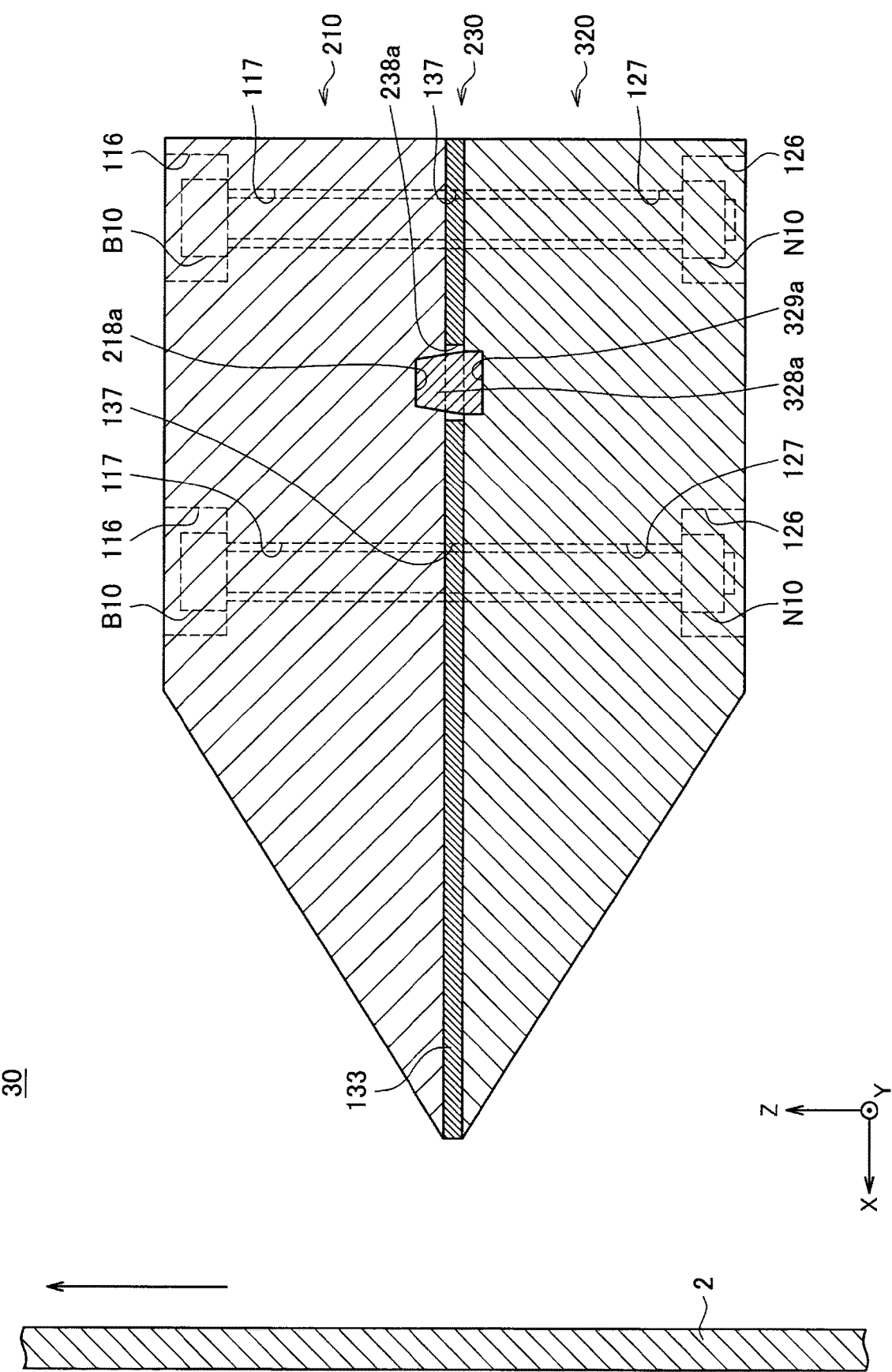

METHOD FOR MANUFACTURING A GAS WIPING NOZZLE

FIELD

The present invention relates to a method for manufacturing a gas wiping nozzle and to a gas wiping nozzle.

BACKGROUND

A continuous hot dip metal plating apparatus is an apparatus for plating a metal strip such as a steel strip by zinc or another molten metal. This continuous hot dip metal plating apparatus is provided with, as rolls arranged in a plating tank storing the molten metal, a sink roll changing a direction of conveyance of the metal strip and a pair of support rolls correcting the shape of the metal strip to flatten it. The metal strip is introduced into the plating bath in an inclined direction, changed in direction of conveyance by the sink roll to upward in the vertical direction, then run while gripped between the pair of support rolls and pulled up to the outside of the plating bath. After that, gas wiping nozzles placed at the two sides of the metal strip blow gas to the surfaces of the metal strip to remove excess molten metal deposited on the surfaces of the metal strip and pulled up along with it to thereby adjust the amount of deposition of molten metal (below, also referred to as the "coating weight").

At the front end part of the end part of a gas wiping nozzle at the metal strip side, a slit extending in the width direction of the metal strip is formed as an ejection port of gas to be ejected from the inside of the gas wiping nozzle. The gas wiping nozzle ejects gas through the slit to blow the gas against a surface of the metal strip pulled up from the plating bath to thereby remove excess molten metal deposited on the surface of the metal strip. Due to this, the coating weight is adjusted. At the gas wiping nozzle, the slit is specifically formed between the front end parts of the pair of lip parts provided facing each other in the vertical direction.

For example, PTL 1 discloses the art of ejecting a uniform amount of gas (pressure) in a width direction of a steel strip by fastening split members split into two into a top and bottom piece through a shim at the back end parts, placing a damper provided with a large number of nozzle holes between the slit-shaped gas ejection port of the assembled gas nozzle and the back end of the nozzle, and employing a predetermined arrangement as the arrangement of the nozzle holes. In the gas nozzle, a slit-shaped gas ejection port is formed by fastening the top member and the bottom member together through the shim between the facing surfaces except at the center part of the front end.

CITATIONS LIST

Patent Literature

[PTL 1] Japanese Utility Model Publication No. 6-025355U
[PTL 2] Japanese Utility Model Publication No. 63-34161U

SUMMARY

Technical Problem

A gas wiping nozzle is specifically manufactured by assembling it by fastening a top lip part and a bottom lip part by screwing them together using bolts and nuts in a state facing each other. Further, at the time of maintenance on part or all of the parts forming the gas wiping nozzle, the top lip part and the bottom lip part are again assembled. Such assembly is performed by inserting bolts into screw insert holes provided at the lip parts to pass through the top lip part and the bottom lip part in the facing direction (specifically, the vertical direction) and fastening nuts on the front end parts of the bolts.

The dimensions of the screw insert holes are generally set to dimensions corresponding to the nominal diameters of the bolts to be inserted. As the correspondence between the dimensions of the screw insert holes and the nominal diameters of bolts, for example, the relationship prescribed in the JIS standards is used. Specifically, when M12 bolts are used to fasten the pair of lip parts, the inside diameters of the screw insert holes corresponding to the bolts can be set to 13.5 mm. In this case, the difference of the inside diameters of the screw insert holes of the lip parts and the outside diameters of the threaded parts of the bolts inserted into the screw insert holes is 1.5 mm. For this reason, in the state where bolts are inserted into the screw insert holes of the lip parts, a variation of relative position of as much as 3 mm may arise in the radial direction between the screw insert holes of the top lip part and the screw insert holes of the bottom lip part. Accordingly, a variation of relative position of as much as 3 mm may arise between the pair of lip parts in the direction perpendicular to the facing direction (specifically, the horizontal direction). In this way, in the assembly of the top lip part and the bottom lip part, the relative positional relationship between the pair of lip parts may vary in accordance with the difference in the dimensions of the screw insert holes provided at the lip parts and the dimensions of the bolts.

Further, sometimes the weight of one lip part would for example exceed 100 kg or relatively heavy, so when screwing together a pair of lip parts, it was difficult to adjust the relative positional relationship between the pair of lip parts. Further, each lip part for example had a length of about 1 to 2 m in the width direction of the metal strip and was relatively large in size. This also was a factor making adjustment of the relative positional relationship between the pair of lip parts difficult. For this reason, even when a skilled assembly worker assembled the top lip part and the bottom lip part, it was difficult to keep the relative positional relationship between the pair of lip parts from varying due to assembly of the gas wiping nozzle. Specifically, if M12 bolts were used as explained above for fastening the pair of lip parts, a variation in relative position of 1 to 2 mm or more in the thickness direction of the metal strip occurred between the pair of lip parts.

Note that, for example, as disclosed in PTL 2, there is a gas wiping nozzle in which packing-use grooves are formed in the bottom side of the top lip part and the top side of the bottom lip part and packing is fit into these packing-use grooves. In such a gas wiping nozzle, it is believed relative positioning between the pair of lip parts is realized by packing being fit into the packing-use grooves. However, packing is a part for sealing a fluid, so the relative positioning between the pair of lip parts by the packing and packing-use grooves cannot be said to be sufficient in precision.

The shape of the front end part of a gas wiping nozzle affects the flow of gas ejected from the gas wiping nozzle, so the greater the variation of the relative positional relationship between the pair of lip parts, the harder it becomes to control the flow of the gas ejected. In particular, the relative positional relationship between the pair of lip parts in the thickness direction of the metal strip greatly affects the flow of the gas ejected.

In this regard, in recent years, for the purpose of improving the productivity in plating a steel strip or other metal strip with a molten metal, faster speed of conveyance of the metal strip is being sought. If raising the speed of conveyance of the metal strip, the amount of molten metal pulled up while deposited on the metal strip increases, so to manage the coating weight to become a desired value, a need can arise for increasing the amount of molten metal removed by the gas wiping. For this reason, the pressure of the gas striking the metal strip has been made to increase to a relatively large pressure.

To make the pressure of the gas striking the metal strip increase to a relatively large pressure, a need may arise to particularly precisely control the flow of gas ejected from the gas wiping nozzle. If control of the flow of gas is difficult, the pressure of the gas striking the sheet will become insufficient. Accordingly, the coating weight may become excessive in the metal strip as a whole. Further, if control of the flow of gas is difficult, the pressure of the gas striking the sheet will easily vary, so the coating weight at different positions of the metal strip will vary and the coating weight may become uneven in the width direction of the metal strip. Accordingly, if the speed of conveyance of the metal strip is made higher, the problem of the coating weight of the molten metal on the metal strip (specifically, the steel strip) becoming unstable due to variation of the relative positional relationship between the pair of lip parts will be particularly remarkable.

Therefore, the present invention was made considering the above problem. An object of the present invention is to provide a novel and improved method for manufacturing a gas wiping nozzle and a gas wiping nozzle able to stabilize the coating weight of the molten metal on the steel strip.

Solution to Problem

To solve the above problem, according to one aspect of the present invention, there is provided a method for manufacturing a gas wiping nozzle provided with a pair of lip parts provided facing each other and a slit formed as a gas ejection port between the pair of lip parts and blowing a gas from the slit against a steel strip pulled up from a molten metal plating bath so as to adjust a thickness of a molten metal film deposited on a surface of the steel strip, which method for manufacturing a gas wiping nozzle comprising a fitting step of fitting fitting projections provided at one lip part with fitting holes provided at another slip part and a fastening step of fastening the pair of lip parts together in the fitted state where the fitting projections are fitted with the fitting holes, two pairs of the fitting projections and the fitting holes provided separated by a distance in a width direction of the steel strip, relative movement between the pair of lip parts in a thickness direction of the steel strip restricted in the fitted state, the distance between the fitting projections and the fitting holes in the thickness direction of the steel strip satisfying the following formula (1):

$$D \leq 0.25 \times B \qquad (1)$$

where
D: distance between the fitting projections and the fitting holes in thickness direction of the steel strip [mm]
B: slit gap of the slit [mm]

The fitting projections may include a first fitting projection and second fitting projection, the fitting holes may include a first fitting hole and second fitting hole in which the first fitting projection and the second fitting projection are respectively fitted, the first fitting projection and the second fitting projection may have circular cross-sectional shapes, the first fitting hole may be a round hole, and the second fitting hole may be an elongated hole longer in a width direction of the steel strip than a thickness direction of the steel strip.

A length of the second fitting hole in a width direction of the steel strip may satisfy the following formula (2):

$$L1 \geq \varphi1 + 20 \times 10^{-6} \times \Delta T \times W \qquad (2)$$

where
L1: length of the second fitting hole in a width direction of the steel strip [mm]
φ1: diameter of the second fitting projection [mm]
ΔT: temperature difference between the one lip part and the other lip part [K]
W: length of the pair of lip parts in a width direction of the steel strip [mm]

A projecting length of the first fitting projection may be longer compared with a projecting length of the second fitting projection and, in the fitting step, a front end part of the first fitting projection may be inserted into the first fitting hole, then the first fitting projection and the second fitting projection may be respectively fitted with the first fitting hole and the second fitting hole.

The fitting projections may include pins attached to pin fastening holes provided running through the one lip part in a direction at which the pair of lip parts face each other, while the fitting holes may include pin insert holes provided running through the other lip part in a direction at which the pair of lip parts face each other.

The material of the pins and the material of the pair of lip parts may be the same.

The fitting projections may include projecting parts provided in a surface of the one lip part at the other lip part side, while the fitting holes may include recessed parts provided at a surface of the other lip part at the one lip part side.

The projecting parts may have tapered shapes with cross-sections becoming smaller the further toward a top part while the recessed parts may have tapered shapes with cross-sections becoming smaller the further toward a bottom part.

Further, to solve the above problem, according to another aspect of the present invention, there is provided a gas wiping nozzle provided with a pair of lip parts provided facing each other and a slit formed as a gas ejection port between the pair of lip parts and blowing a gas from the slit against a steel strip pulled up from a molten metal plating bath so as to adjust a thickness of a molten metal film deposited on a surface of the steel strip, in which gas wiping nozzle, one lip part is provided with fitting projections, another lip part is provided with fitting holes in which the fitting projections are fitted, two pairs of the fitting projections and the fitting holes are provided separated by a distance in a width direction of the steel strip, and a distance between the fitting projections and the fitting holes in the thickness direction of the steel strip satisfy the following formula (1):

$$D \leq 0.25 \times B \qquad (1)$$

where
D: distance between the fitting projections and the fitting holes in thickness direction of the steel strip [mm]

B: slit gap of the slit [mm]

Advantageous Effects of Invention

As explained above, according to the present invention, it becomes possible to stabilize the coating weight of the molten metal with respect to the steel strip.

BRIEF DESCRIPTION OF DRAWINGS

FIG. 16 is a cross-sectional view showing an example of a gas wiping nozzle according to another modification.

DESCRIPTION OF EMBODIMENTS

Below, preferred embodiments of the present invention will be explained in detail while referring to the attached drawings. Note that, in the Description and Drawings, constituent elements having substantially the same functions and configurations will be assigned the same notations and overlapping explanations will be omitted.

1. Configuration of Continuous Hot Dip Metal Plating Apparatus

Figure 1:
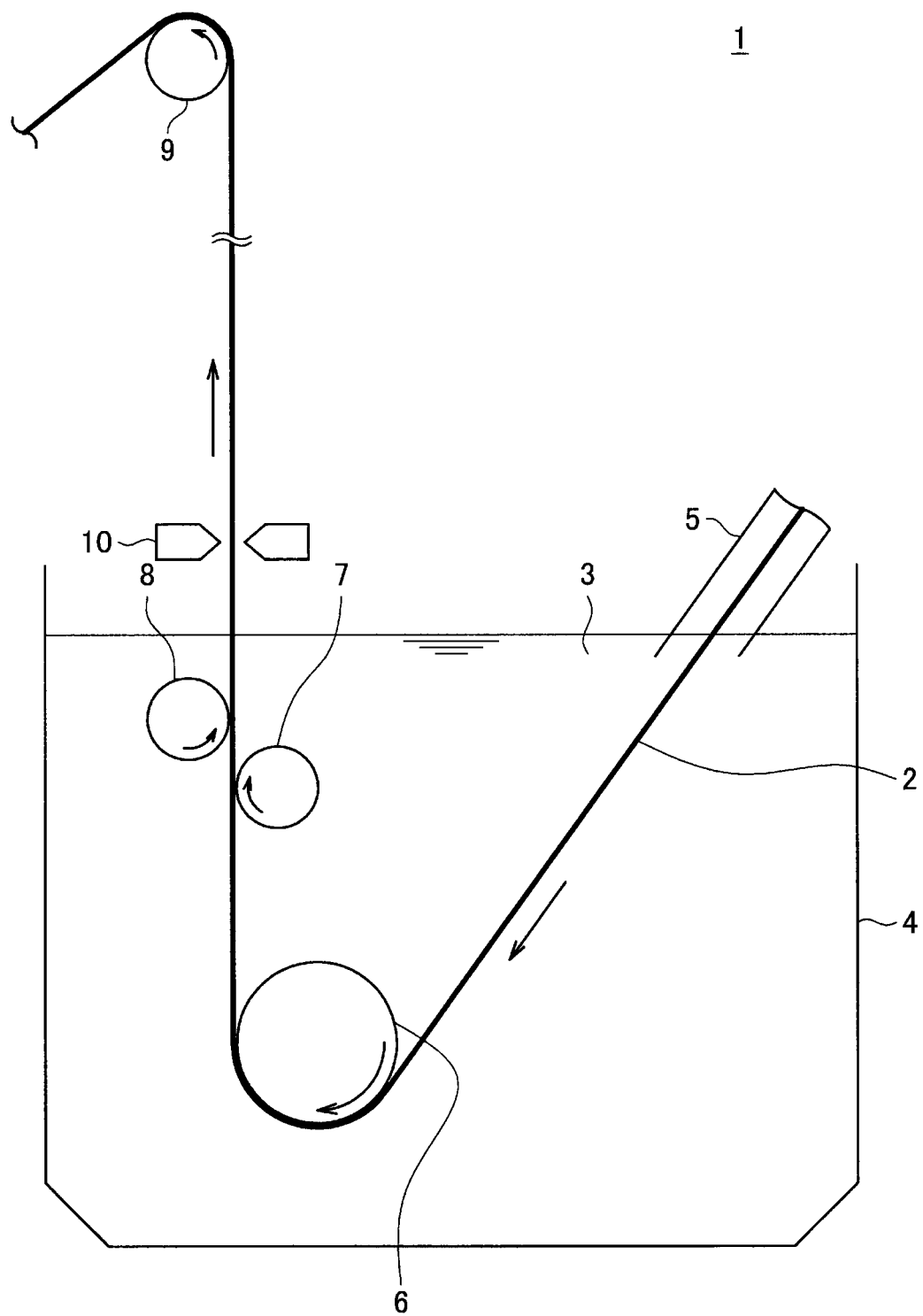
FIG. 1 is a schematic view showing one example of the schematic configuration of a continuous hot dip metal plating apparatus according to an embodiment of the present invention.

First, referring to FIG. 1, the configuration of a continuous hot dip metal plating apparatus 1 according to an embodiment of the present invention will be explained. FIG. 1 is a schematic view showing one example of the schematic configuration of the continuous hot dip metal plating apparatus 1 according to the embodiment of the present invention.

As shown in FIG. 1, the continuous hot dip metal plating apparatus 1 is an apparatus which dips a steel strip 2 in a plating bath 3 filled with a molten metal so as to continuously deposit the molten metal on the surfaces of the steel strip 2, then adjust the molten metal to a predetermined coating weight. The continuous hot dip metal plating apparatus 1 is provided with a plating tank 4, snout 5, sink roll 6, pair of top and bottom support rolls 7, 8, top roll 9, and gas wiping nozzles 10.

The steel strip 2 is one example of a metal strip to be plated by the molten metal. Further, as the molten metal forming the plating bath 3, for example, Zn, Al, Sn, or Pb alone or alloys of these may be illustrated. Alternatively, the molten metal includes metal comprised of these metals or alloys further containing, for example, Si, P, and other nonferrous metal elements, Ca, Mg, Sr, and other typical metal elements, and Ti, V, Cr, Mn, Fe, Co, Ni, Cu, and other transition metal elements. In the following explanation, an example where molten zinc is used as the molten metal forming the plating bath 3 and molten zinc is deposited on the surfaces of the steel strip 2 to produce a galvanized steel sheet will be explained.

The plating tank 4 stores a plating bath 3 comprised of a molten metal. The snout 5 is connected at its top end to for example an exit side of an annealing furnace and is provided with a bottom end inclined immersed inside the plating bath 3. The sink roll 6 is arranged at the lower place inside the plating bath 3. The sink roll 6 has a diameter larger than the support rolls 7 and 8. The sink roll 6 rotates clockwise in the illustration along with conveyance of the steel strip 2 and changes the direction of conveyance of the steel strip 2, which was introduced through snout 5 to the inside of the plating bath 3 downward at a slant, to upward in the vertical direction.

The support rolls 7 and 8 are arranged in the plating bath 3 above the sink roll 6 and grip from the two left and right sides the steel strip 2 changed in direction by the sink roll 6 and pulled up upward in the vertical direction. The support rolls 7 and 8 suppress vibration of the steel strip 2 being pulled up. The support rolls 7 and 8 may also be just a single roll instead of a pair or may be three or more rolls. Alternatively, the support rolls 7 and 8 may also be omitted. The top roll 9 is arranged above the plating bath 3 and above the sink roll 6. The top roll 9 changes the direction of conveyance of the steel strip 2 pulled up from the plating bath 3 upward in the vertical direction and adjusted in coating weight of the molten metal to a discharging direction.

The gas wiping nozzles 10 adjust the coating weight of the molten metal with respect the steel strip 2 by ejecting nitrogen or air or another gas to be blown against the surfaces of the steel strip 2. Gas compressed by a not shown compressor etc. is introduced into the gas wiping nozzles 10. The gas wiping nozzles 10 are arranged at the both sides of the steel strip 2 in the thickness direction and are arranged above the support rolls 7 and 8 at positions of predetermined heights from the bath level of the plating bath 3. The gas ejected from the gas wiping nozzles 10 is blown against the two surfaces of the steel strip 2 pulled up from the plating bath 3 upward in the vertical direction whereby excess molten metal is removed. Due to this, the coating weight of the molten metal with respect to the surfaces of the steel strip 2 is adjusted to a suitable amount and the thickness of the molten metal film deposited on the surfaces of the steel strip 2 is adjusted.

Specifically, inside each of the gas wiping nozzles 10, a nozzle chamber into which gas is introduced is formed. At the front end part of the end part of each of the gas wiping nozzle 10 at the each steel strip 2 side, a slit extending in the width direction of the steel strip 2 is formed. The gas introduced into the nozzle chamber is ejected from the slit and blown against the steel strip 2. In this way, the slit functions as an ejection port ejecting the gas introduced into the nozzle chamber. The gas wiping nozzle 10 is provided with a pair of lip parts provided facing each other in the vertical direction. The nozzle chamber is formed inside the pair of lip parts. The slit is formed as the gas ejection port between the front end parts of the pair of lip parts.

The operation of the continuous hot dip metal plating apparatus 1 of the above configuration will be explained. The continuous hot dip metal plating apparatus 1 uses a not shown drive source to make the steel strip 2 move and convey it to the different parts in the apparatus. The steel strip 2 passes through the snout 5 and is introduced into the plating bath 3 downward at a slant, circles around the sink roll 6, and is changed in direction of conveyance to upward in the vertical direction. Next, the steel strip 2 rises between the support rolls 7 and 8 and is pulled up to the outside of the plating bath 3. After that, due to the pressure of the gas blown from the gas wiping nozzle 10, excess molten metal deposited on the steel strip 2 is removed and the amount of deposition of the molten metal on the surfaces of the steel strip 2 is adjusted to a predetermined coating weight. In this way, the continuous hot dip metal plating apparatus 1 continuously dips the steel strip 2 in the plating bath 3 to plate it with molten metal to thereby manufacture steel sheet plated with a predetermined coating weight of molten metal.

The speed of conveyance of the steel strip 2 is specifically a relatively high speed of 150 m/min or more. Due to this, the productivity in manufacture of the molten metal plated steel sheet is improved. However, if the speed of conveyance of the steel strip 2 is relatively high, as explained above, to make the pressure of the gas striking the steel strip 2 increase to a relatively large pressure, a need may arise to particularly precisely control the flow of gas ejected from the gas wiping nozzle 10. For this reason, the problem of the coating weight of the molten metal with respect to the steel strip 2 becoming unstable due to variation in the relative positional relationship between the pair of lip parts becomes particularly remarkable.

2. Configuration of Gas Wiping Nozzle

Figure 2:
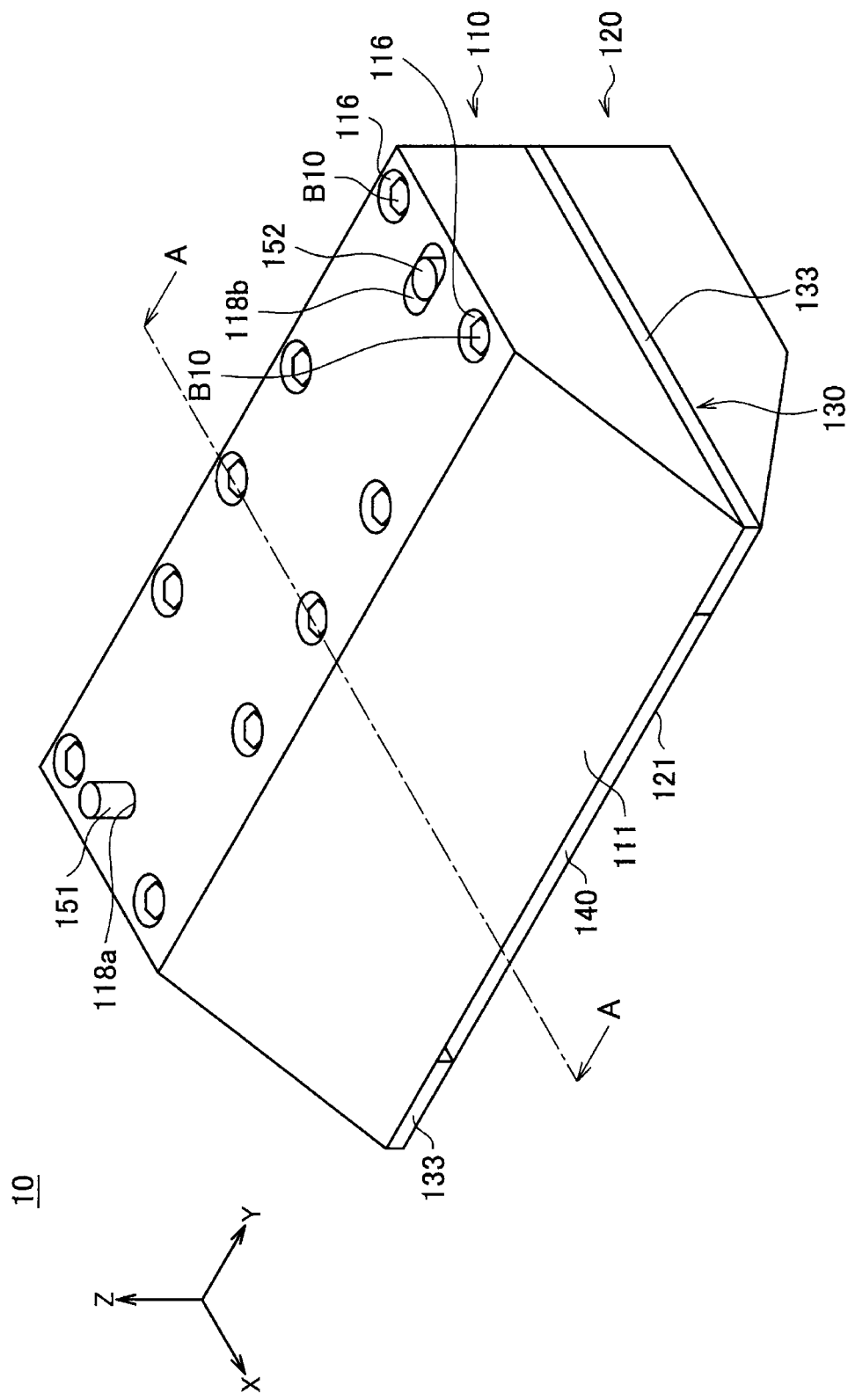
FIG. 2 is a perspective view showing one example of a gas wiping nozzle according to the same embodiment.
Figure 3:
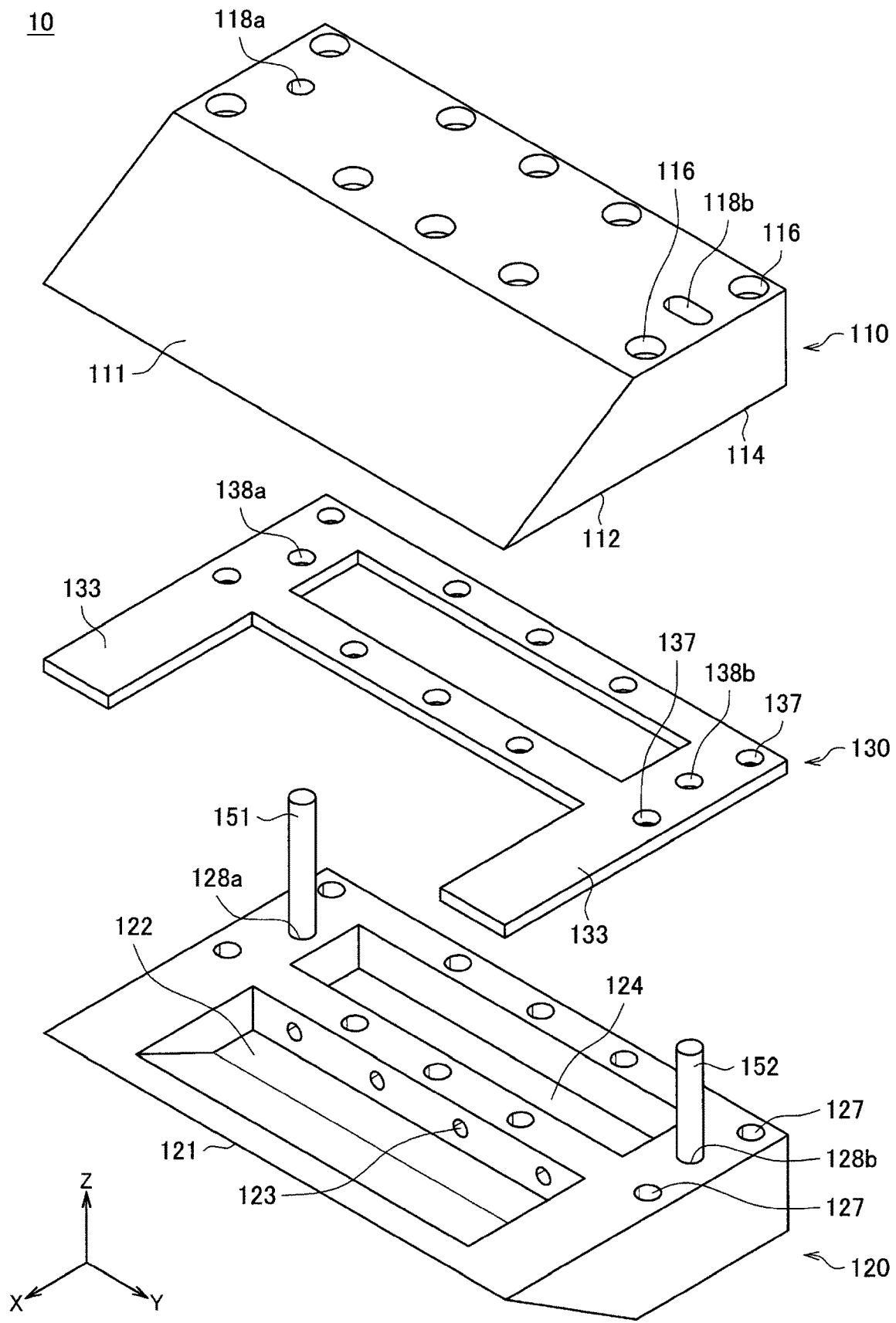
FIG. 3 is a disassembled perspective view showing one example of the gas wiping nozzle according to the same embodiment.
Figure 4:
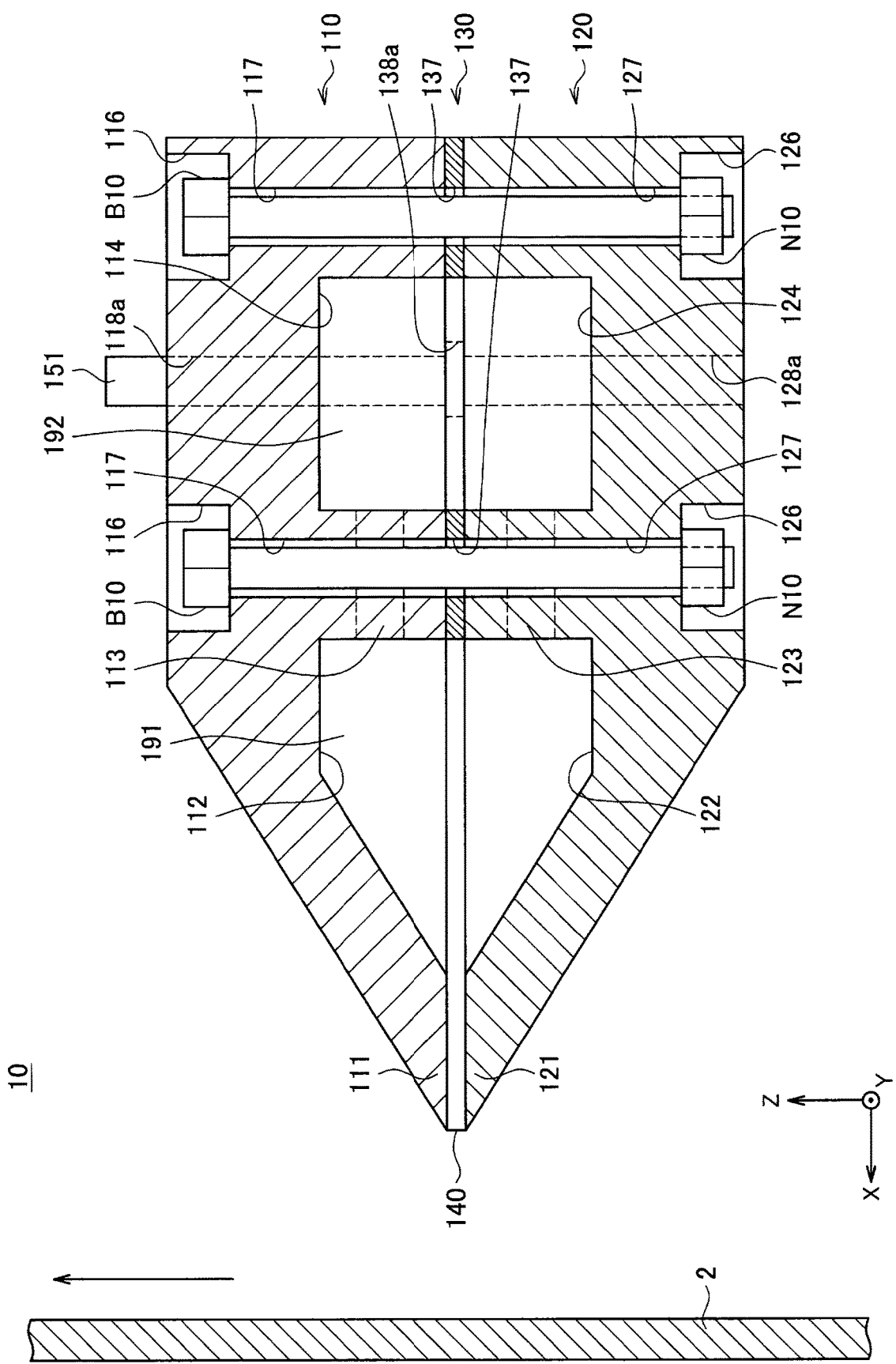
FIG. 4 is a cross-sectional view showing one example of the gas wiping nozzle according to the same embodiment.

Next, referring to FIG. 2 to FIG. 4, the configuration of each gas wiping nozzle 10 according to the present embodiment will be explained. FIG. 2 is a perspective view showing one example of the gas wiping nozzle 10 according to the present embodiment. FIG. 3 is a disassembled perspective view showing one example of the gas wiping nozzle 10 according to the present embodiment. FIG. 4 is a cross-sectional view showing one example of the gas wiping nozzle 10 according to the present embodiment. Specifically, FIG. 4 is a cross-sectional view of the cross-section A-A shown in FIG. 2. The cross-section A-A is a cross-section perpendicularly intersecting the width direction of the steel strip 2 and passing through the slit 140.

Note that, a pair of the gas wiping nozzles 10, as explained above, are arranged at the both sides of the steel strip 2 in the thickness direction, but in FIG. 2 to FIG. 4, only one is shown. Illustration of the other is omitted. Further, in FIG. 3, illustration of the later explained bolts B10 and nuts N10 is omitted. Further, in the drawings, the thickness direction of the steel strip 2 is shown as the X-direction, the width direction of the steel strip 2 is shown as the Y-direction, and the vertical direction perpendicularly intersecting the X-direction and Y-direction is shown as the Z-direction.

The gas wiping nozzle 10 according to the present embodiment, for example, as shown in FIG. 2 to FIG. 4, is comprised including a top lip part 110 and a bottom lip part 120 provided facing each other in the vertical direction, a shim 130 sandwiched between the top lip part 110 and the bottom lip part 120, and a slit 140 formed between a front end part 111 of an end of the top lip part 110 at the steel strip 2 side and a front end part 121 of an end of the bottom lip part 120 at the steel strip 2 side.

The top lip part 110 and the bottom lip part 120, as shown in FIG. 4, are provided facing each other. At the inside of the top lip part 110 and the bottom lip part 120, a nozzle chamber 191 and gas header chamber 192 are formed. The top lip part 110 and the bottom lip part 120 correspond to the pair of lip parts according to the present invention. The top lip part 110 and the bottom lip part 120, for example, are formed by stainless steel.

The nozzle chamber 191 and gas header chamber 192 are respectively formed at the front end side and the back end side of the gas wiping nozzle 10 at the inside of the top lip part 110 and the bottom lip part 120. Specifically, the sunken part 112 and sunken part 114 forming the top part of the nozzle chamber 191 and the top part of the gas header chamber 192 respectively are formed at the front end side and the back end side of the bottom part of the top lip part 110. On the other hand, the sunken part 122 and sunken part 124 forming the bottom part of the nozzle chamber 191 and the bottom part of the gas header chamber 192 respectively are formed at the front end side and the back end side of the top part of the bottom lip part 120. The top lip part 110 and the bottom lip part 120 are fastened through the shim 130 so that the corresponding sunken parts are joined whereby the nozzle chamber 191 and gas header chamber 192 are formed.

The top lip part 110 and the bottom lip part 120, for example, as shown in FIG. 4, are substantially parallel with each other at the back end side of the gas wiping nozzle 10. For this reason, the dimensions of the gas header chamber 192 in the vertical direction are substantially constant from the back end side to the front end side. On the other hand, the top lip part 110 and the bottom lip part 120 approach each other at the front end side of the gas wiping nozzle 10 the further toward the front end side. For this reason, the dimensions in the vertical direction of the nozzle chamber 191 become shorter the further toward the front end side.

At the portion between the nozzle chamber 191 and the gas header chamber 192 at the top lip part 110 and the bottom lip part 120, communication holes 113 and communication holes 123 running through the portion from the back end side to the front end side are respectively provided. Due to this, the nozzle chamber 191 and gas header chamber 192 are communicated with each other by the communication holes 113 and 123. A plurality of the communication holes 113 and communication holes 123 are specifically provided along the width direction of the steel strip 2.

At the back end side of the gas wiping nozzle 10, a not shown introduction hole is provided communicating the gas header chamber 192 and the outside and introducing gas to the inside of the gas header chamber 192. For example, at the back end side of the top lip part 110, a communication hole is provided running through it in the vertical direction. The gas introduced into the gas header chamber 192 is configured to be introduced through the communication holes 113 and 123 to the nozzle chamber 191. Specifically, the gas header chamber 192 functions as a gas header. Gas introduced to the inside of the gas header chamber 192 is rectified by passing through the communication holes 113 and 123 and is introduced into the nozzle chamber 191. Further, the nozzle chamber 191 functions as an equalization chamber. The gas introduced to the inside of the nozzle chamber 191 is ejected from different positions of the later explained slit 140 in the longitudinal direction toward the steel strip 2.

The top lip part 110 and the bottom lip part 120 are, for example, fastened together in the vertical direction by being screwed together by the bolts B10 and nuts N10. Specifically, the top lip part 110 and the bottom lip part 120 are fastened in the vertical direction in the state gripping the shim 130.

For example, at the portion of the top lip part 110 at the back end side from the gas header chamber 192 and the portion between the nozzle chamber 191 and the gas header chamber 192, pluralities of counterbored holes 116 and screw insert holes 117 are provided along the width direction of the steel strip 2. The counterbored holes 116 are provided down to depths corresponding to the dimensions of the heads of the bolts B10 from the top surface of the top lip part 110. The screw insert holes 117 are holes having inside diameters larger than the outside diameters of the threaded parts of the bolts B10 and through which the threaded parts of the bolts B10 are passed. The screw insert holes 117 are provided passing through from the bottom surfaces of the counterbored holes 116 to the bottom surface of the top lip part 110.

Further, at the portion of the bottom lip part 120 at the back end side from the gas header chamber 192 and the portion between the nozzle chamber 191 and the gas header chamber 192, pluralities of counterbored holes 126 and screw insert holes 127 are provided along the width direction of the steel strip 2. The counterbored holes 126 are provided down to depths corresponding to the dimensions of the nuts N10 from the bottom surface of the bottom lip part 120. The screw insert holes 127 are holes having inside diameters larger than the outside diameters of the threaded parts of the bolts B10 and through which the threaded parts of the bolts B10 are passed. The screw insert holes 127 are passing through provided from the bottom surfaces of the counterbored holes 126 to the top surface of the bottom lip part 120. At the bottom lip part 120, the counterbored holes 126 and screw insert holes 127 are provided at positions corresponding to the counterbored holes 116 and screw insert holes 117.

Further, at the portion of the shim 130 at the back end side from the gas header chamber 192 and the portion between the nozzle chamber 191 and the gas header chamber 192, pluralities of screw insert holes 137 are provided along the width direction of the steel strip 2. The screw insert holes 137 are holes having inside diameters larger than the outside diameters of the threaded parts of the bolts B10 and through which threaded parts of the bolts B10 are inserted. At the shim 130, the screw insert holes 137 are provided at positions corresponding to the counterbored holes 116 and screw insert holes 117 or counterbored holes 126 and screw insert holes 127.

The bolts B10 are, for example, inserted from the counterbored hole 116 side of the top lip part 110 through the screw insert holes 117, screw insert holes 137, and screw insert holes 127. Further, inside the counterbored holes 126 at the bottom lip part 120, nuts N10 are screwed onto the front end parts of the bolts B10. Due to this, the top lip part 110 and the bottom lip part 120 are fastened together by the bolts B10 and nuts N10.

In the present embodiment, the top lip part 110 is provided with a pin insert hole 118a and pin insert hole 118b used in the method for manufacturing the gas wiping nozzle 10 explained later. In the later explained method for manufacture, a pin 151 and pin 152 provided at the bottom lip part 120 are fitted with the pin insert hole 118a and pin insert hole 118b. The pin insert hole 118a and pin insert hole 118b are provided at the top lip part 110 separated by a distance in the width direction of the steel strip 2. Further, the pin insert hole 118a and pin insert hole 118b are provided passing through the top lip part 110 in the vertical direction (that is, the direction in which the top lip part 110 and the bottom lip part 120 face each other, that is, the vertical direction Z). Specifically, the pin insert hole 118a is provided alongside the sunken part 114 at one side in the width direction of the steel strip 2, while the pin insert hole 118b is provided alongside the sunken part 114 at the other side in the width direction of the steel strip 2.

In the present embodiment, the pin insert hole 118a and pin insert hole 118b correspond to examples of the fitting holes of the present invention. Specifically, the fitting holes include a first fitting hole and a second fitting hole into which a later explained first fitting projection and second fitting projection are respectively fitted. The pin insert hole 118a corresponds to an example of the first fitting hole according to the present invention, while the pin insert hole 118b corresponds to an example of the second fitting hole according to the present invention. Note that, details of the shapes and dimensions of the pin insert hole 118a and pin insert hole 118b will be explained later.

Further, in the present embodiment, the bottom lip part 120 is provided with the pin 151 and pin 152 used in the method for manufacturing a gas wiping nozzle 10 explained later. In the later explained method for manufacture, the pin 151 and pin 152 are fitted with the pin insert hole 118a and pin insert hole 118b. The pin 151 and pin 152 are provided at the bottom lip part 120 separated by a distance in the width direction of the steel strip 2. Specifically, the pin 151 and pin 152 are attached to the pin fastening hole 128a and pin fastening hole 128b provided at the bottom lip part 120. The pin fastening hole 128a and pin fastening hole 128b are provided at the bottom lip part 120 at positions corresponding to the pin insert hole 118a and pin insert hole 118b separated by a distance in the width direction of the steel strip 2. Further, the pin fastening hole 128a and pin fastening hole 128b are provided passing through the bottom lip part 120 in the vertical direction (that is, in the direction in which the top lip part 110 and the bottom lip part 120 face each other, that is, the vertical direction Z). Specifically, the pin fastening hole 128a is provided alongside the sunken part 124 at one side in the width direction of the steel strip 2, while the pin fastening hole 128b is provided alongside the sunken part 124 at the other side in the width direction of the steel strip 2.

In the present embodiment, the pin 151 and pin 152 attached to the pin fastening hole 128a and pin fastening hole 128b respectively correspond to examples of the fitting projections according to the present invention. Specifically, the fitting projections include a first fitting projection and second fitting projection. The pin 151 corresponds to an example of the first fitting projection according to the present invention, while the pin 152 corresponds to one example of the second fitting projection according to the present invention. Note that, details of the shapes and dimensions of the pin 151 and pin 152 and the pin fastening hole 128*a* and pin fastening hole 128*b* will be explained in detail later.

Further, in the present embodiment, the shim 130 is provided with a pin insert hole 138*a* and pin insert hole 138*b* for avoiding interference with the pins provided at the bottom lip part 120. For example, the pin insert hole 138*a* and pin insert hole 138*b* are provided passing through the shim 130 in the vertical direction at positions of the shim 130 corresponding to the pin 151 and pin 152. Note that, details of the shapes and dimensions of the pin insert hole 138*a* and pin insert hole 138*b* will be explained later.

The shim 130 abuts against the portions of the front end parts of the each lip parts other than the center parts in the width direction of the steel strip 2. Specifically, the top part of the shim 130 abuts against the portion of the front end part 111 of the top lip part 110 other than the center part in the width direction of the steel strip 2. On the other hand, the bottom part of the shim 130 abuts against the portion of the front end part 121 of the bottom lip part 120 other than the center part in the width direction of the steel strip 2. Due to this, it is possible to provide a distance corresponding to the thickness of the shim 130 between the front end part 111 of the top lip part 110 and the front end part 121 of the bottom lip part 120. For this reason, between the front end part 111 of the top lip part 110 and the front end part 121 of the bottom lip part 120, as shown in FIG. 2 and FIG. 4, a slit 140 is formed as an ejection port ejecting gas introduced to the nozzle chamber 191. The slit 140 specifically extends in the width direction of the steel strip 2.

Further, the shim 130, as shown in FIG. 3, has a pair of side extensions 133 extending from the back end side to the front end side at the both sides in the width direction of the steel strip 2. Due to this, the slit 140 is formed in the longitudinal direction by the front end parts of the pair of side extensions 133.

The slit gap of the slit 140 (that is, the dimension of the slit 140 in the vertical direction), for example, is 0.4 mm to 1.2 mm or so. Specifically, it is suitably set based on various parameters so that the coating weight of the molten metal with respect to the steel strip 2 becomes the desired value. As the parameters, there are, for example, the various dimensions of the gas wiping nozzle 10, the internal pressure of the nozzle chamber 191, the positional relation between the gas wiping nozzle 10 and the steel strip 2, etc. Note that, the dimensions of the slit 140 in the longitudinal direction can be suitably set corresponding to the width of the steel strip 2.

3. Method for Manufacturing Gas Wiping Nozzle

Next, referring to FIG. 5 to FIG. 9, a method for manufacturing the gas wiping nozzle 10 according to the present embodiment will be explained.

The method for manufacturing the gas wiping nozzle 10 according to the present embodiment, for example, includes a pin attachment step, shim attachment step, fitting step, and fastening step. Further, the method for manufacturing the gas wiping nozzle 10 may further include a removal step.

The pin attachment step is a step of attaching the pins to the bottom lip part 120. Specifically, at the pin attachment step, the pair of pins of the pin 151 and the pin 152 are attached to the bottom lip part 120.

Figure 5:
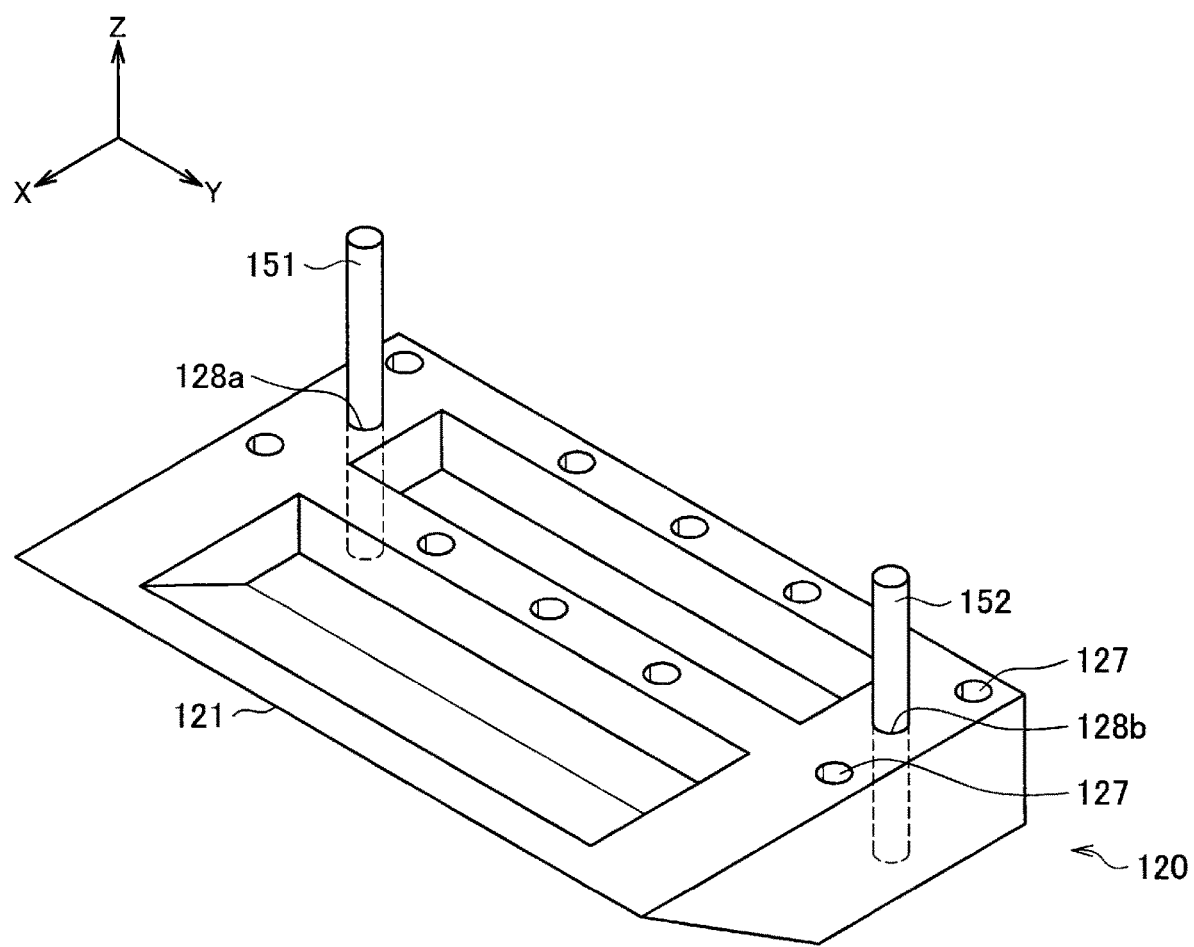
FIG. 5 is a perspective view showing the state of a pin attachment step in a method for manufacturing a gas wiping nozzle according to the same embodiment.

FIG. 5 is a perspective view showing the state of the pin attachment step in the method for manufacturing a gas wiping nozzle 10 according to the present embodiment.

For example, in the pin attachment step, the pin 151 is inserted into the pin fastening hole 128*a* from above and is fastened to the pin fastening hole 128*a* by the fit of the bottom end of the pin 151 with the pin fastening hole 128*a*. Due to this, the pin 151, as shown in FIG. 5, is attached to the pin fastening hole 128*a* in the state with the top part sticking out upward from the bottom lip part 120. Further, the pin 152 is inserted into the pin fastening hole 128*b* from above and is fastened to the pin fastening hole 128*b* by the fit of the bottom end of the pin 152 with the pin fastening hole 128*b*. Due to this, the pin 152, as shown in FIG. 5, is attached to the pin fastening hole 128*b* in the state with the top part sticking out upward from the bottom lip part 120. In this way, the pin 151 and pin 152 are provided at one lip part and stick out toward the other lip part side. As explained above, the pin 151 and pin 152 correspond to examples of the fitting projections of the present invention.

Here, the pin fastening hole 128*a* and pin fastening hole 128*b*, as explained above, are provided at the bottom lip part 120 separated by a distance in the width direction of the steel strip 2. For this reason, at the bottom lip part 120, the pin 151 and pin 152 provided as the fitting projections are provided separated by a distance in the width direction of the steel strip 2. Further, as explained above, the fitting holes of the pin insert hole 118*a* and pin insert hole 118*b* are provided at the top lip part 110 separated by a distance in the width direction of the steel strip 2. In this way, two pairs of the fitting projections and fitting holes are provided separated by a distance in the width direction of the steel strip 2. Note that, from the viewpoint of effectively improving the precision of relative positioning between the top lip part 110 and the bottom lip part 120, the pairs of the fitting projections and fitting holes are preferably positioned at the both end parts of the each lip parts in the width direction of the steel strip 2 respectively.

The pin 151 corresponding to one example of the first fitting projection and the pin 152 corresponding to one example of the second fitting projection according to the present invention have circular cross-sectional shapes. For example, the pin 151 and pin 152 have circular columnar shapes. The outside diameters of the pin 151 and pin 152, for example, are preferably 5 to 20 mm from the viewpoint of securing the strength and workability. Further, the pin fastening hole 128*a* and pin fastening hole 128*b* of the bottom lip part 120 are round holes. The fit between the pin 151 and pin fastening hole 128*a* and the fit between the pin 152 and pin fastening hole 128*b* are specifically set to fits of an extent enabling detachment of the pin 151 and pin 152 from the pin fastening hole 128*a* and pin fastening hole 128*b* by being struck by a hammer etc.

Here, from the viewpoint of suppressing the difference of the amount of deformation between the each pin fastening holes and each pins at the bottom lip part 120 due to heat expansion at the time of use of the gas wiping nozzle 10, the material of the pin 151 and pin 152 and the material of the top lip part 110 and the bottom lip part 120 are preferably the same. That is, in the present embodiment, the pin 151 and pin 152 are preferably formed by stainless steel in the same way as the top lip part 110 and the bottom lip part 120.

Note that, the pin 151 and pin 152 can have shapes different from circular columnar shapes. For example, the pin 151 and pin 152 may also have polygonal columnar shapes. In this case, the pin fastening hole 128*a* and pin fastening hole 128*b* of the bottom lip part 120 may be polygonal shaped holes. In this way, the shapes and dimensions of the pin fastening hole 128*a* and pin fastening hole 128*b* of the bottom lip part 120 are set in accordance with the shapes and dimensions of the pin 151 and pin 152.

Further, in the pin attachment step, for example, the pin 151 and pin 152 are attached so that the top end part of the pin 151 is positioned higher than the top end part of the pin 152. In this case, the projecting length of the pin 151 (that is, the distance from the top surface of the bottom lip part 120 to the top end part of the pin 151) is longer than the projecting length of the pin 152 (that is, the distance from the top surface of the bottom lip part 120 to the top end part of the pin 152). Such a positional relationship of the top end parts of the pin 151 and pin 152 can be realized for example by using a pin longer than the pin 152 as the pin 151.

The shim attachment step is a step of attaching the shim 130 to the bottom lip part 120.

Figure 6:
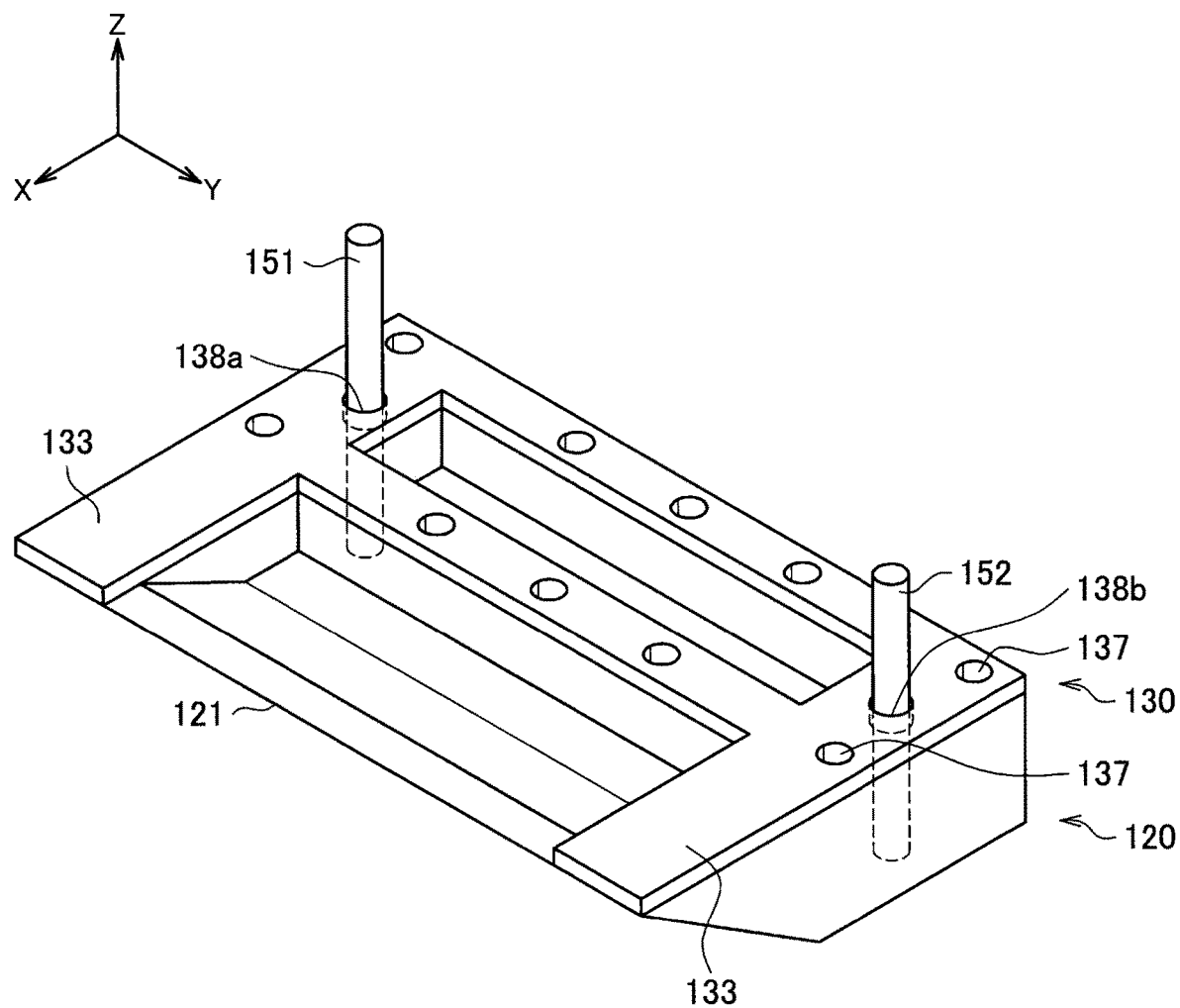
FIG. 6 is a perspective view showing the state of a shim attachment step in the method for manufacturing a gas wiping nozzle according to the same embodiment.

FIG. 6 is a perspective view showing the state of a shim attachment step in the method for manufacturing a gas wiping nozzle 10 according to the present embodiment.

For example, at the shim attachment step, the shim 130 is placed on the top part of the bottom lip part 120 from above so that the top end parts of the pin 151 and pin 152 pass through the pin insert hole 138a and pin insert hole 138b of the shim 130 from the bottom. Due to this, the shim 130, as shown in FIG. 6, is attached to the bottom lip part 120 in the state abutting against the portion of the front end part 121 of the bottom lip part 120 other than the center side in the width direction of the steel strip 2.

The shapes and dimensions of the pin insert hole 138a and pin insert hole 138b of the shim 130 are set according to the shapes and dimensions of the pin 151 and pin 152. For example, the pin insert hole 138a and pin insert hole 138b of the shim 130 are round holes. Further, the inside diameters of the pin insert hole 138a and pin insert hole 138b are specifically set to relatively large dimensions of an extent enabling the shim 130 to avoid interference with the pin 151 and pin 152.

The fitting step is the step of fitting the fitting projections provided at one lip part with the fitting holes provided at the other lip part. Specifically, in the present embodiment, at the fitting step, the fitting projections of the pin 151 and pin 152 provided at the bottom lip part 120 are fitted with the fitting holes of the pin insert hole 118a and pin insert hole 118b provided at the top lip part 110.

Figure 7:
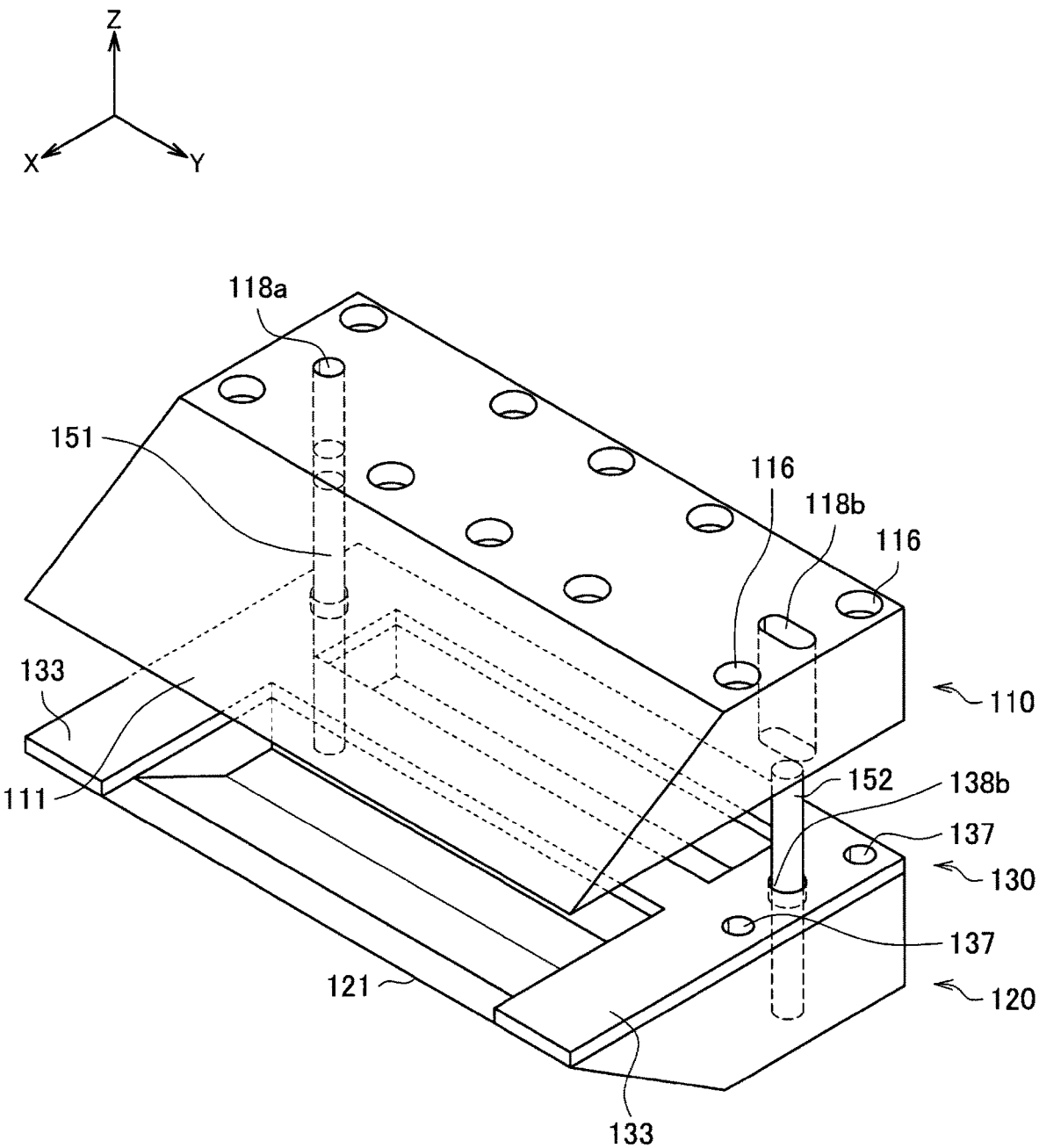
FIG. 7 is a perspective view showing the state of a fitting step in the method for manufacturing a gas wiping nozzle according to the same embodiment.
Figure 8:
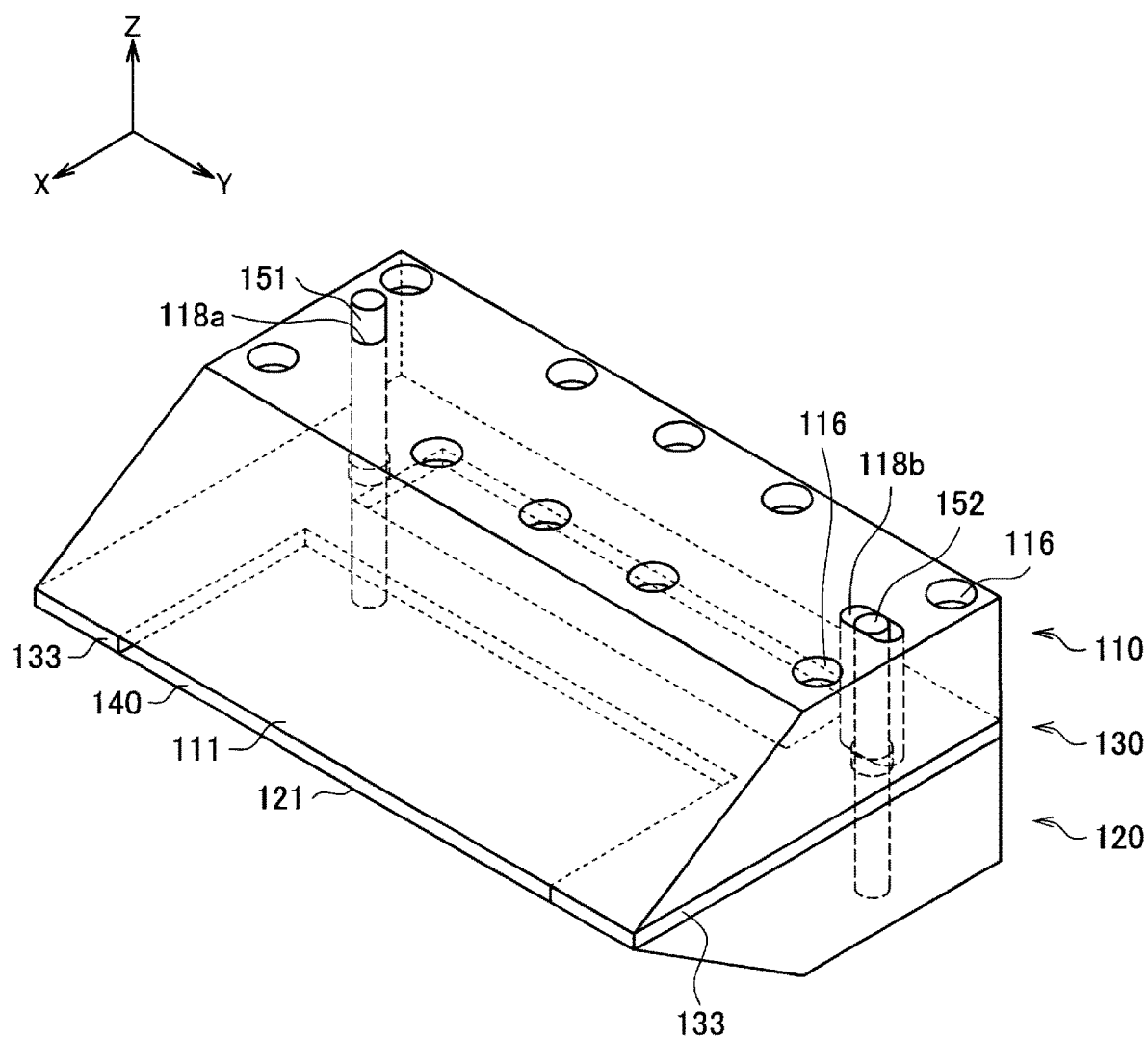
FIG. 8 is a perspective view showing the state of the fitting step in the method for manufacturing a gas wiping nozzle according to the same embodiment.

FIG. 7 and FIG. 8 are perspective views showing the state of the fitting step in the method for manufacturing the gas wiping nozzle 10 according to the present embodiment.

For example, at the fitting step, the top lip part 110 is placed on the top of the bottom lip part 120 from above so that the top parts of the pin 151 and pin 152 are inserted into the pin insert hole 118a and pin insert hole 118b of the top lip part 110 from below. Here, the top end part of the pin 151, as explained above, can be positioned higher than the top end part of the pin 152. In this case, the projecting length of the pin 151 is longer compared with the projecting length of the pin 152. For this reason, first, as shown in FIG. 7, the top end part of the front end part of the pin 151 is inserted into the pin insert hole 118a. Due to this, the top lip part 110 can freely rotate relative to the bottom lip part 120 about the center axis of the pin 151. Note that, the top lip part 110 can be conveyed by, for example, providing the top lip part 110 with an eyebolt and using the eyebolt to hoist the top lip part 110 by a crane etc.

After that, as shown in FIG. 8, the pin 151 and pin 152 are respectively fitted with the pin insert hole 118a and pin insert hole 118b. Due to this, relative rotation between the top lip part 110 and the bottom lip part 120 about the center axis of the pin 151 is restricted whereby relative movement between the top lip part 110 and the bottom lip part 120 in directions other than the vertical direction (Z-direction) is restricted. Accordingly, in the fitted state where the fitting projections of the pin 151 and pin 152 are fitted with the fitting holes of the pin insert hole 118a and pin insert hole 118b, relative movement between the top lip part 110 and the bottom lip part 120 in the thickness direction (X-direction) of the steel strip 2 is restricted.

The shapes and dimensions of the pin insert hole 118a and pin insert hole 118b of the top lip part 110 are set in accordance with the shapes and dimensions of the pin 151 and pin 152.

For example, the pin insert hole 118a of the top lip part 110 corresponding to one example of the first fitting hole according to the present invention is a round hole. The pin 151 and pin insert hole 118a have circular cross-sectional shapes, so in the state with the pin 151 fitted with the pin insert hole 118a, the outer circumferential surface of the pin 151 and the inner circumferential surface of the pin insert hole 118a abut against each other over their entireties. By the pin 151 being fitted with the pin insert hole 118a in this way, it is possible to realize a state where the pin insert hole 118a provided at the top lip part 110 and the pin 151 attached to the bottom lip part 120 are positioned on the same axis.

The fit between the pin 151 and the pin insert hole 118a is specifically set to a fit of an extent enabling the top lip part 110 to slide with respect to the pin 151 by its own weight. More specifically, from the viewpoint of suitably restricting relative movement between the top lip part 110 and the bottom lip part 120 in the thickness direction of the steel strip 2 in the fitted state where the pin 151 and pin 152 are fitted with the pin insert hole 118a and pin insert hole 118b, the distance D1 [mm] between the pin 151 and the pin insert hole 118a in the thickness direction of the steel strip 2 satisfies the following formula (3). Note that, B [mm] in formula (3) shows the slit gap of the slit 140.

$$D1 \leq 0.25 \times B \tag{3}$$

Note that, the inside diameter of the pin insert hole 118a is preferably a relatively small dimension in a range set so as to satisfy formula (3). Due to this, in the fitted state where the pin 151 and pin 152 are fitted with the pin insert hole 118a and pin insert hole 118b, it is possible to more suitably restrict relative movement between the top lip part 110 and the bottom lip part 120 in the thickness direction of the steel strip 2.

Further, for example, the pin insert hole 118b of the top lip part 110 corresponding to one example of the second fitting hole according to the present invention is an elongated hole which extends along the width direction of the steel strip 2 and is longer in the width direction of the steel strip 2 than the thickness direction of the steel strip 2. For this reason, in the state where the pin 152 is fitted with the pin insert hole 118b, the outside surface of the pin 152 and the inside surface of the pin insert hole 118b abut against each other in the thickness direction of the steel strip 2. By the pin 152 being fitted with the pin insert hole 118b in this way, it is possible to realize restriction of relative rotation between the top lip part 110 and the bottom lip part 120 about the center axis of the pin 151.

The length of the pin insert hole 118b in the thickness direction of the steel strip 2 is specifically set to a dimension of an extent enabling the top lip part 110 to slide with respect to the pin 152 by its own weight. More specifically, from the viewpoint of suitably restricting relative movement between the top lip part 110 and the bottom lip part 120 in the thickness direction of the steel strip 2 in the fitted state where the pin 151 and pin 152 are fitted with the pin insert hole 118a and pin insert hole 118b, the distance D2 [mm]

between the pin 152 and the pin insert hole 118b in the thickness direction of the steel strip 2 satisfies the following formula (4):

$$D2 \leq 0.25 \times B \tag{4}$$

Note that, the length of the pin insert hole 118b in the thickness direction of the steel strip 2 is preferably a relatively small dimension within the range set so as to satisfy formula (4). Due to this, in the fitted state where the pin 151 and pin 152 are fitted with the pin insert hole 118a and pin insert hole 118b, it is possible to more suitably restrict relative movement between the top lip part 110 and the bottom lip part 120 in the thickness direction of the steel strip 2.

In this way, at the gas wiping nozzle 10, the distance D [mm] between the fitting projections and the fitting holes in the thickness direction of the steel strip 2 (that is, the difference between the outside diameter of the fitting projections and the inside diameter of the fitting holes) satisfies the formula (1):

$$D \leq 0.25 \times B \tag{1}$$

The present inventors engaged in tests on actual machines and simulations by numerical analysis and accordingly discovered that by setting the dimensions of the inside diameters of the fitting holes and the outside diameters of the fitting projections so that the distance D between the fitting projections and the fitting holes in the thickness direction of the steel strip 2 satisfies formula (1), it is possible to make the variation in coating weight at the steel strip 2 1 g/m² or less. Here, variation in the coating weight of 1 g/m² or less corresponds to the case of plating the molten metal by a uniformity of an extent enabling the required quality to be secured.

Specifically, from the results of studies on actual machines, as examples where the distance D does not satisfy formula (1), it was learned that when the distance D is 0.35×B, the variation in coating weight becomes 1.05 g/m², while when the distance D is 0.45×B, the variation in coating weight becomes 1.35 g/m². As a result, it is believed that when the distance D does not satisfy formula (1), due to variation in the relative positional relationship between the pair of lip parts in the thickness direction of the steel strip 2, it becomes difficult to precisely control the flow of gas ejected from the gas wiping nozzle 10 and the pressure of the gas striking the steel strip 2 easily varies.

On the other hand, from the results of studies on actual machines, as examples where the distance D satisfies formula (1), it was learned that when the distance D is 0.25×B, the variation in coating weight becomes 0.75 g/m², while when the distance D is 0.15×B, the variation in coating weight becomes 0.45 g/m². As a result, it is believed that when the distance D satisfies formula (1), the relative positional relationship between the pair of lip parts in the thickness direction of the steel strip 2 is kept from varying, whereby it becomes possible to precisely control the flow of gas ejected from the gas wiping nozzle 10 and the pressure of the gas striking the steel strip 2 is kept from varying.

As explained above, by the distance D between the fitting projections and the fitting holes in the thickness direction of the steel strip 2 satisfying the formula (1), it is possible to suitably restrict relative movement between the pair of lip parts in the thickness direction of the steel strip 2 in the fitted state, so it possible to make the variation in coating weight at the steel strip 2 1 g/m² or less.

Here, in the fitting step, as explained above, by the outer surface of the pin 152 and the inner surface of the pin insert hole 118b abutting against each other in the thickness direction of the steel strip 2, relative rotation between the top lip part 110 and the bottom lip part 120 about the center axis of the pin 151 is restricted. For this reason, the length of the pin insert hole 118b in the width direction of the steel strip 2 basically does not affect the relative positioning precision between the top lip part 110 and the bottom lip part 120.

If the length of the pin insert hole 118b in the width direction of the steel strip 2 is excessively short, for example, it can become difficult to insert the pin 151 and pin 152 in the pin insert hole 118a and pin insert hole 118b at the time of assembly of the gas wiping nozzle 10 due to heat deformation or machining error etc. at the time of use at the gas wiping nozzle 10.

Further, at the time of use of the gas wiping nozzle 10, the bottom lip part 120 is closer to the plating bath 3 than the top lip part 110, so becomes a higher temperature. For this reason, at the time of use of the gas wiping nozzle 10, a temperature difference arises between the top lip part 110 and the bottom lip part 120 and the amount of deformation due to heat expansion differs. Due to this, the pin 152 provided at the bottom lip part 120 can be pushed against the inside surface of the pin insert hole 118b provided at the top lip part 110.

For this reason, the length of the pin insert hole 118b in the width direction of the steel strip 2 specifically is preferably set from the viewpoint of facilitating assembly of the gas wiping nozzle 10 and the viewpoint of effectively keeping the pins and pin insert holes from being damaged due to the difference in amounts of deformation due to heat expansion between the lip parts at the time of use of the gas wiping nozzle 10.

More specifically, the length L1 [mm] of the pin insert hole 118b in the width direction of the steel strip 2 preferably satisfies the following formula (2). Note that, in formula (2), φ1 [mm] shows the diameter of the pin 152, ΔT [K] shows the temperature difference between the top lip part 110 and the bottom lip part 120, and W [mm] shows the length of the top lip part 110 and the bottom lip part 120 in the width direction of the steel strip 2. As the temperature difference ΔT, for example, the average value of the temperature differences between the top lip part 110 and the bottom lip part 120 at the time of operation is used.

$$L1 \geq \varphi1 + 20 \times 10^{-6} \times \Delta T \times W \tag{2}$$

As explained above, the lip parts are, for example, formed by stainless steel. The linear expansion coefficient of stainless steel is a small 20×10⁻⁶. For example, the linear expansion coefficient of SUS304 is 17.3×10⁻⁶ or so. For this reason, by the length L1 of the pin insert hole 118b in the width direction of the steel strip 2 satisfying formula (2), at the time of use of the gas wiping nozzle 10, it is possible to more reliably prevent the pin 152 from being pushed against the inside surface of the pin insert hole 118b due to the difference in amount of deformation caused by heat expansion between the top lip part 110 and the bottom lip part 120. Accordingly, it is possible to effectively keep the pins and pin insert holes from being damaged.

Note that, from the viewpoint of improving the work efficiency in assembly of the gas wiping nozzle 10, the length L1 of the pin insert hole 118b in the width direction of the steel strip 2 more preferably satisfies the following formula (5):

$$L1 \geq 2 \times \varphi1 + 20 \times 10^{-6} \times \Delta T \times W \tag{5}$$

Note that, in the above, an example where the pin 151 and the pin insert hole 118a into which the pin 151 is inserted have circular cross-sectional shapes was explained, but the pin 152 and the pin insert hole 118*b* into which the pin 152 is inserted may also have circular cross-sectional shapes. That is, the pin insert hole 118*b* may also be a round hole.

The fastening step is a step of fastening the pair of lip parts together in the fitted state where the fitting projections are fitted with the fitting holes. Specifically, in the present embodiment, at the fastening step, in the fitted state where the fitting projections of the pin 151 and pin 152 are fitted with the fitting holes of the pin insert hole 118*a* and pin insert hole 118*b*, the top lip part 110 and the bottom lip part 120 are fastened with each other. The top lip part 110 and the bottom lip part 120, for example, are fastened together using the bolts B10 and nuts N10. Due to this, the gas wiping nozzle 10 shown in FIG. 2 is manufactured.

Figure 9:
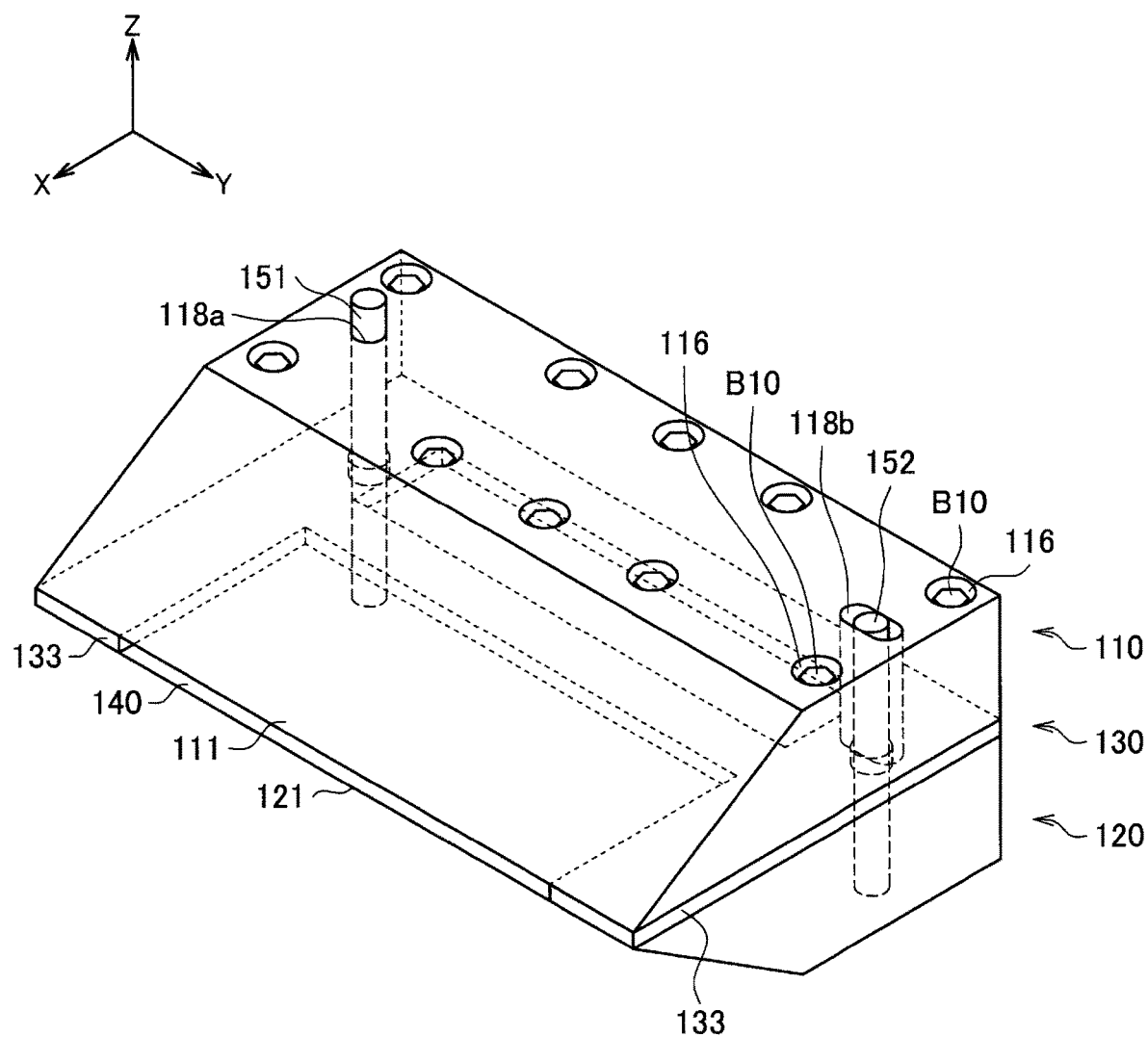
FIG. 9 is a perspective view showing the state of a fastening step in the method for manufacturing a gas wiping nozzle according to the same embodiment.

FIG. 9 is a perspective view showing the state of the fastening step in the method for manufacturing the gas wiping nozzle 10 according to the present embodiment.

For example, in the fastening step, the bolts B10, as shown in FIG. 9, are inserted in the counterbored holes 116 of the top lip part 110 from above. Further, the bolts B10 are screwed into the front end parts of the nuts N10. Due to this, the top lip part 110 and the bottom lip part 120 are fastened together by the bolts B10 and nuts N10.

The removal step is a step of removing the pins from one lip part. Specifically, at the removal step, the pin 151 and pin 152 are removed from the bottom lip part 120.

For example, in the removal step, the pin 151 and pin 152 are struck by a hammer etc., whereby they are removed from the pin fastening hole 128*a* and pin fastening hole 128*b* of the bottom lip part 120. If performing such a removal step, as explained later, it is possible to keep the dimensions of the pins from changing due to the effects of heat.

As explained above, the method for manufacturing the gas wiping nozzle 10 according to the present embodiment includes the fitting step of fitting fitting projections provided at one lip part with fitting holes provided at another lip part and the fastening step of fastening the pair of lip parts together in the fitted state where the fitting projections are fitted with the fitting holes. Further, in the fitted state, relative movement between the pair of lip parts in the thickness direction of the steel strip 2 is restricted.

Here, in the conventional method for manufacturing a gas wiping nozzle, no fitting step making fitting projections fit with fitting holes to enable relative positioning between the pair of lip parts was performed. Further, as explained above, each lip part is relatively heavy and relatively large in size, so it was difficult to adjust the relative positional relationship between the pair of lip parts when screwing together the pair of lip parts. Therefore, even when a skilled assembly worker assembled the top lip part and the bottom lip part, it was difficult to keep the relative positional relationship between the pair of lip parts fin the thickness direction of the steel sheet 2 from varying due to assembly of the gas wiping nozzle. Specifically, a variation in relative position of 1 to 2 mm or so in the thickness direction of the steel strip 2 could occur between the pair of lip parts.

On the other hand, in the present embodiment, the fastening step is performed after the fitting step. Here, in the fitted state, relative movement between the pair of lip parts in the thickness direction of the steel strip 2 is restricted. Specifically, by two pairs of fitting projections (specifically, pins) and fitting holes (specifically, pin insert holes) being provided separated by a distance in the width direction of the steel strip 2, it is possible to realize restriction of relative movement between the pair of lip parts in the thickness direction of the steel strip 2 in the fitted state. Further, the dimensions of the inside diameters of the fitting holes and the outside diameters of the fitting projections are set so that the distance D between the fitting projections and fitting holes in the thickness direction of the steel strip 2 in the fitted state satisfy formula (1). Due to this, relative movement between the pair of lip parts in the thickness direction of the steel strip 2 in the fitted state can be suitably restricted. Accordingly, the relative positional relationship between the pair of lip parts in the thickness direction of the steel strip 2 can be kept from varying due to assembly of the gas wiping nozzle 10. For this reason, it is possible to precisely control the flow of gas ejected by the gas wiping nozzle 10, so it is possible to keep the pressure of gas striking the steel strip 2 from varying. Accordingly, it is possible to stabilize the coating weight of the molten metal with respect to the steel strip 2.

Note that, the relationship between the effect of suppressing variation in the relative positional relationship between the pair of lip parts in the thickness direction of the steel strip 2 due to the fitting step in the present embodiment and the dimensions of the inside diameters of the pin fastening holes, the inside diameters of the pin insert holes, and outside diameters of the pins in the gas wiping nozzle 10 will be explained in detail later.

Further, as explained above, in the present embodiment, the first fitting projection (specifically, the pin 151) and second fitting projection (specifically, the pin 152) may have circular cross-sectional shapes, the first fitting hole (specifically, the pin insert hole 118*a*) may be a round hole, and the second fitting hole (specifically, the pin insert hole 118*b*) may be an elongated hole longer in the width direction of the steel strip 2 than the thickness direction of the steel strip 2. Due to this, for example, it is possible to keep insertion of the first fitting projection and second fitting projection in the first fitting hole and second fitting hole at the time of assembly of the gas wiping nozzle 10 from becoming difficult due to heat deformation at the time of use of the gas wiping nozzle 10, machining error, etc. Further, it is possible to keep the pin 152 provided at the bottom lip part 120 from being pushed against the inside surface of the pin insert hole 118*b* provided at the top lip part 110 due to a difference in amount of deformation by heat expansion due to the formation of a temperature difference between the top lip part 110 and the bottom lip part 120 at the time of use of the gas wiping nozzle 10. For this reason, it is possible to facilitate assembly of the gas wiping nozzle 10 and, further, to keep the pins and pin insert holes from being damaged due to the difference in amount of deformation by heat expansion between the lip parts at the time of use of the gas wiping nozzle 10.

Further, as explained above, in the present embodiment, the length L1 of the elongated second fitting hole in the width direction of the steel strip 2 can satisfy formula (2). Due to this, it is possible to effectively facilitate assembly of the gas wiping nozzle 10 and, further, effectively keep the pins and pin insert holes from being damaged due to the difference in amount of deformation due to heat expansion between the lip parts at the time of use of the gas wiping nozzle 10.

Further, as explained above, in the present embodiment, the projecting length of the first fitting projection is longer than the projecting length of the second fitting projection. At the fitting step, the front end part of the first fitting projection is inserted into the first fitting hole, then the first fitting projection and second fitting projection can be fitted in the first fitting hole and second fitting hole. Due to this, at the time of assembly of the gas wiping nozzle 10, it is possible to easily insert the first fitting projection and second fitting projection into the first fitting hole and second fitting hole. For this reason, it is possible to more effectively facilitate the assembly of the gas wiping nozzle 10.

Further, as explained above, in the present embodiment, a fitting projection can include a pin attached to a pin fastening hole provided passing through one lip part in the direction where the pair of lip parts face each other, while a fitting hole can include a pin insert hole provided passing through another lip part in the direction where the pair of lip parts face each other. Further, at the fitting step, the pin can be fitted with the pin insert hole by insertion into it. Due to this, in the fitted state where the pin is fitted with the pin insert hole, it is possible to effectively restrict relative movement between the pair of lip parts in the direction intersecting the direction where the pair of lip parts face each other. For this reason, in the fitted state, it is possible to effectively restrict relative movement between the pair of lip parts in the thickness direction of the steel strip 2.

Further, as explained above, in the present embodiment, the material of the pins and material of the pair of lip parts may be the same. Due to this, at the time of use of the gas wiping nozzle 10, at the bottom lip part 120, it is possible to suppress a difference in the amounts of deformation between the pin fastening holes and the pins due to heat expansion. For this reason, it is possible to keep pins and pin insert holes from being damaged due to the amounts of deformation of the pins greatly exceeding the amounts of deformation of the pin fastening holes and keep pins from falling out from pin fastening holes due to the amounts of deformation of the pin fastening holes greatly exceeding the amounts of deformation of the pins.

Further, as explained above, the method for manufacturing the gas wiping nozzle 10 according to the present embodiment can include the removal step of removing the pins from one lip part after the fastening step. Due to this, it is possible to set the gas wiping nozzle 10 above the plating bath 3 in the state with the pins detached. For this reason, it is possible to keep the pins from being exposed to a high temperature environment. Accordingly, it is possible to keep the dimensions of the pins from changing due to the effects of heat.

EXAMPLES

The relationship between the effect of suppression of variation in the relative positional relationship between the pair of lip parts in the thickness direction of the steel strip 2 due to the fitting step in the present embodiment and dimensions of the inside diameters of the pin fastening holes, the inside diameters of the pin insert holes, and the outside diameters of the pins in above-mentioned gas wiping nozzle 10 will be explained with reference to an example. In the example, as explained below, the dimensions in the above-mentioned gas wiping nozzle 10 are specifically set.

In this example, the reference dimension of the inside diameter of the pin fastening holes 128*a* and 128*b* was made 12 mm and the tolerance class was made H7. For this reason, the upper limit value of the dimensional tolerance of the inside diameter of the pin fastening holes 128*a* and 128*b* was 12.018 mm and the lower limit value was 12.000 mm.

Further, in this example, the reference dimension of the inside diameter of the pin insert hole 118*a* was made 12 mm and the tolerance class was made H7. For this reason, the upper limit value of the dimensional tolerance of the inside diameter of the pin insert hole 118*a* was 12.018 mm and the lower limit value was 12.000 mm.

Further, in this example, the upper limit value of the dimensional tolerance of the length of the pin insert hole 118*b* in the thickness direction of the steel strip 2 was 12.018 mm and the lower limit value was 12.000 mm.

Further, in this example, the reference dimension of the outside diameters of the pins 151 and 152 was made 12 mm and the tolerance class was made h5. For this reason, the upper limit value of the dimensional tolerance of the outside diameter of the pins 151 and 152 was 12.000 mm and the lower limit value was 11.992 mm.

The difference between the inside diameter of the pin fastening hole 128*a* and the outside diameter of the pin 151 is as much as 0.026 mm while the difference between the inside diameter of the pin insert hole 118*a* and the outside diameter of the pin 151 is as much as 0.026 mm. For this reason, in the fitted state where the pins are fitted with the pin insert holes, a variation in the relative position of as much as 0.052 mm can occur between the pin insert hole 118*a* of the top lip part 110 and the pin fastening hole 128*a* of the bottom lip part 120 in the thickness direction of the steel strip 2.

The difference between the inside diameter of the pin fastening hole 128*b* and the outside diameter of the pin 152 is as much as 0.026 mm while the difference between the length of the pin insert hole 118*b* in the thickness direction of the steel strip 2 and the outside diameter of the pin 152 is as much as 0.026 mm. For this reason, in the fitted state where the pins are fitted with the pin insert holes, a variation in the relative position of as much as 0.052 mm can occur between the pin insert hole 118*b* of the top lip part 110 and the pin fastening hole 128*b* of the bottom lip part 120 in the thickness direction of the steel strip 2.

Accordingly, in this example, the variation in the relative position between the pair of lip parts in the thickness direction of the steel strip 2 becomes as much as 0.052 mm. In this way, according to the above example, it was confirmed that variation in the positions between the pair of lip parts in the thickness direction of the steel strip 2 is remarkably suppressed due to the fitting step in the present embodiment. For this reason, in the present embodiment, by performing the fastening step after the fitting step, it is possible to keep the relative positional relationship between the pair of lip parts in the thickness direction of the steel strip 2 from varying due to assembly of the gas wiping nozzle 10.

Note that, in the above, an example where the tolerance class of the inside diameter of the pin insert hole 118*a* was made H7 and the tolerance class of the outside diameters of the pins 151 and 152 was made h5 was explained, but the tolerance class of the inside diameter of the pin insert hole 118*a* and the outside diameters of the pins 151 and 152 are not particularly limited to such an example. Further, the tolerance class may also differ between the inside diameter of the pin insert hole 118*a* and the length of the pin insert hole 118*b* in the thickness direction of the steel strip 2. Note that, these tolerance classes may be suitably set in accordance with the priorities of the point of suppressing variation in the relative positional relationship between the pair of lip parts in the thickness direction of the steel strip 2 and the point of improving the efficiency of assembly work of the gas wiping nozzle.

4. Modification

Next, a modification will be explained with reference to FIG. 10 to FIG. 16.

Configuration of Gas Wiping Nozzle

First, referring to FIG. 10 to FIG. 13, the configuration of a gas wiping nozzle 20 according to the modification will be explained.

Figure 10:
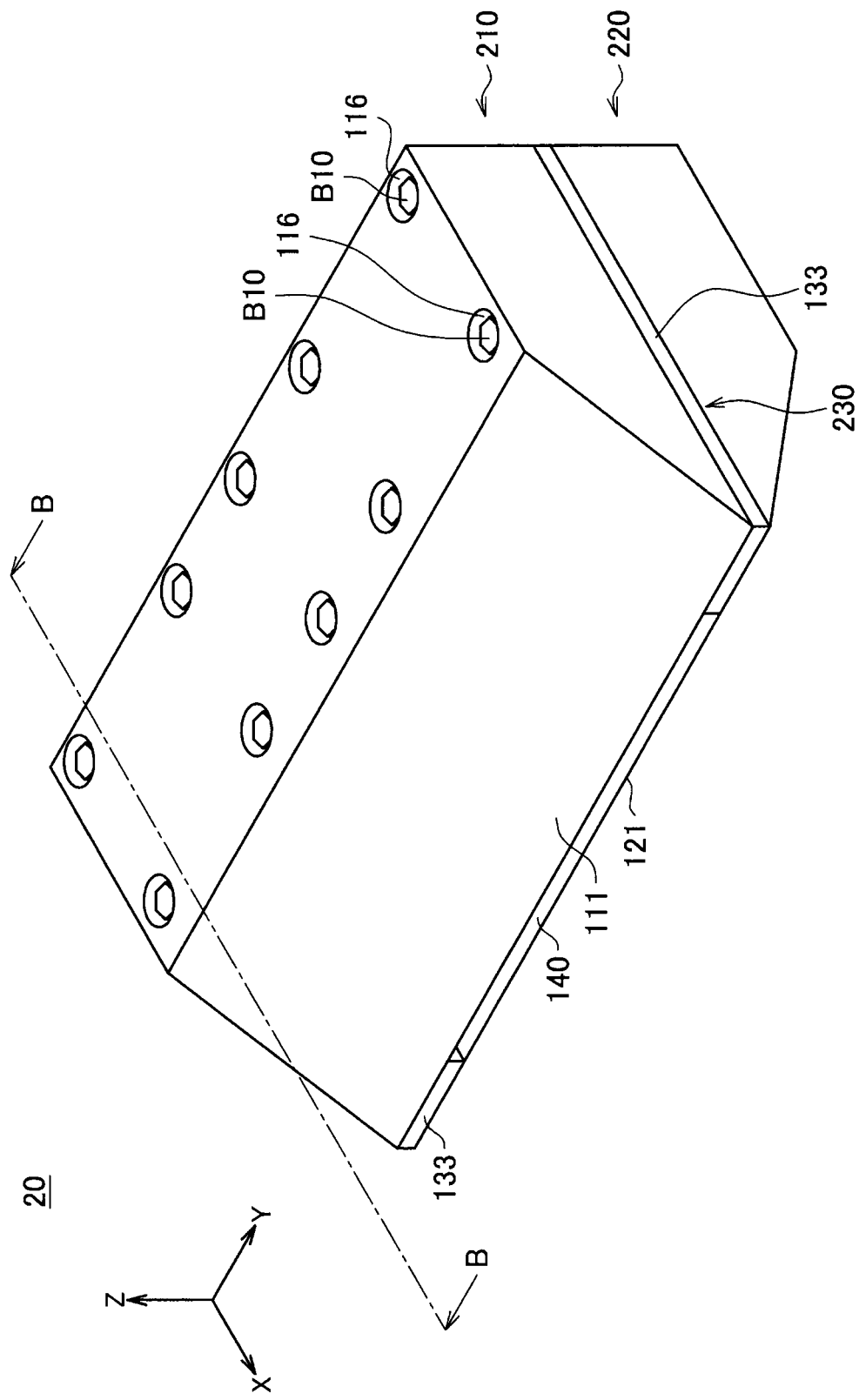
FIG. 10 is a perspective view showing one example of a gas wiping nozzle according to a modification.
Figure 11:
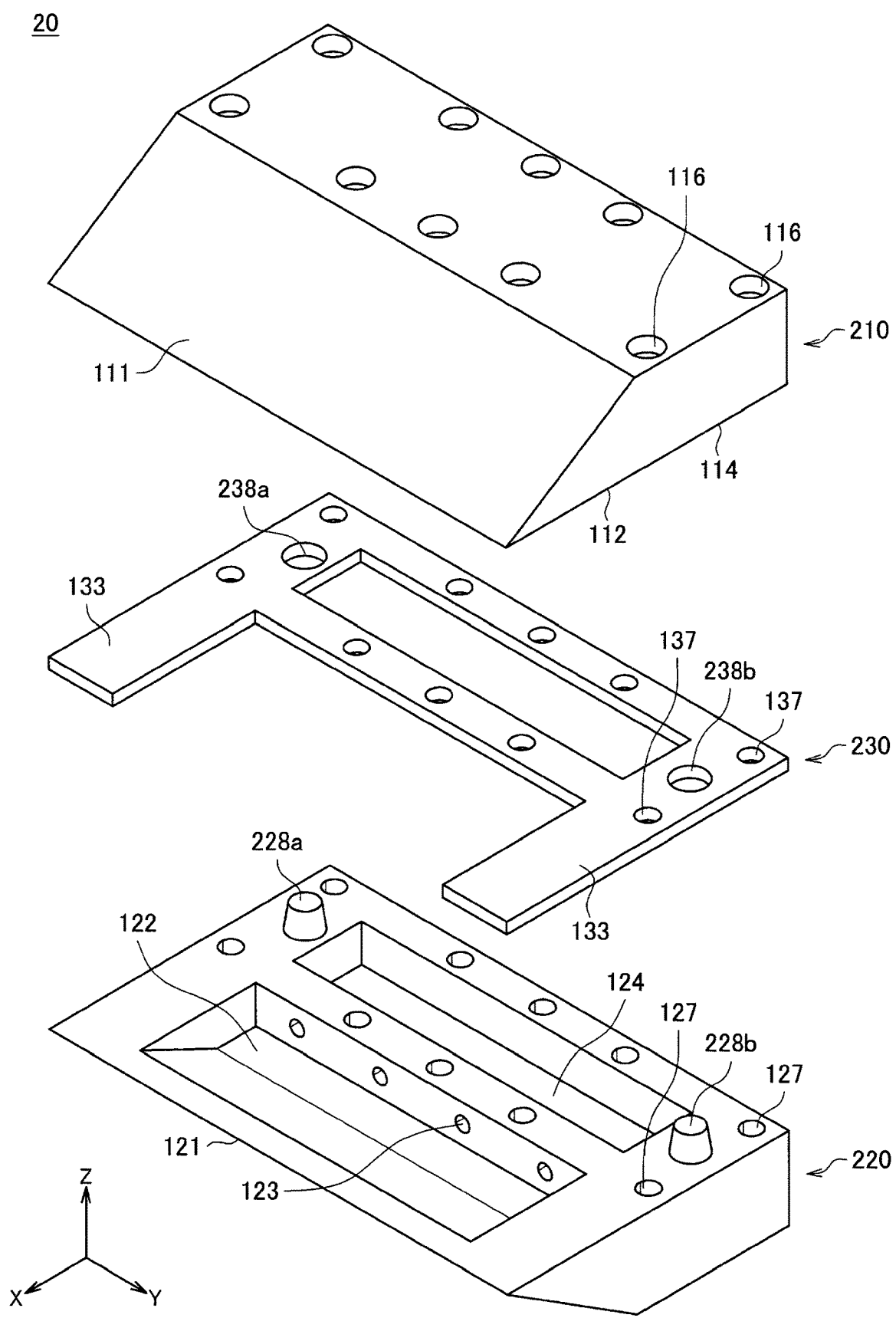
FIG. 11 is a disassembled perspective view showing one example of the gas wiping nozzle according to the modification.
Figure 12:
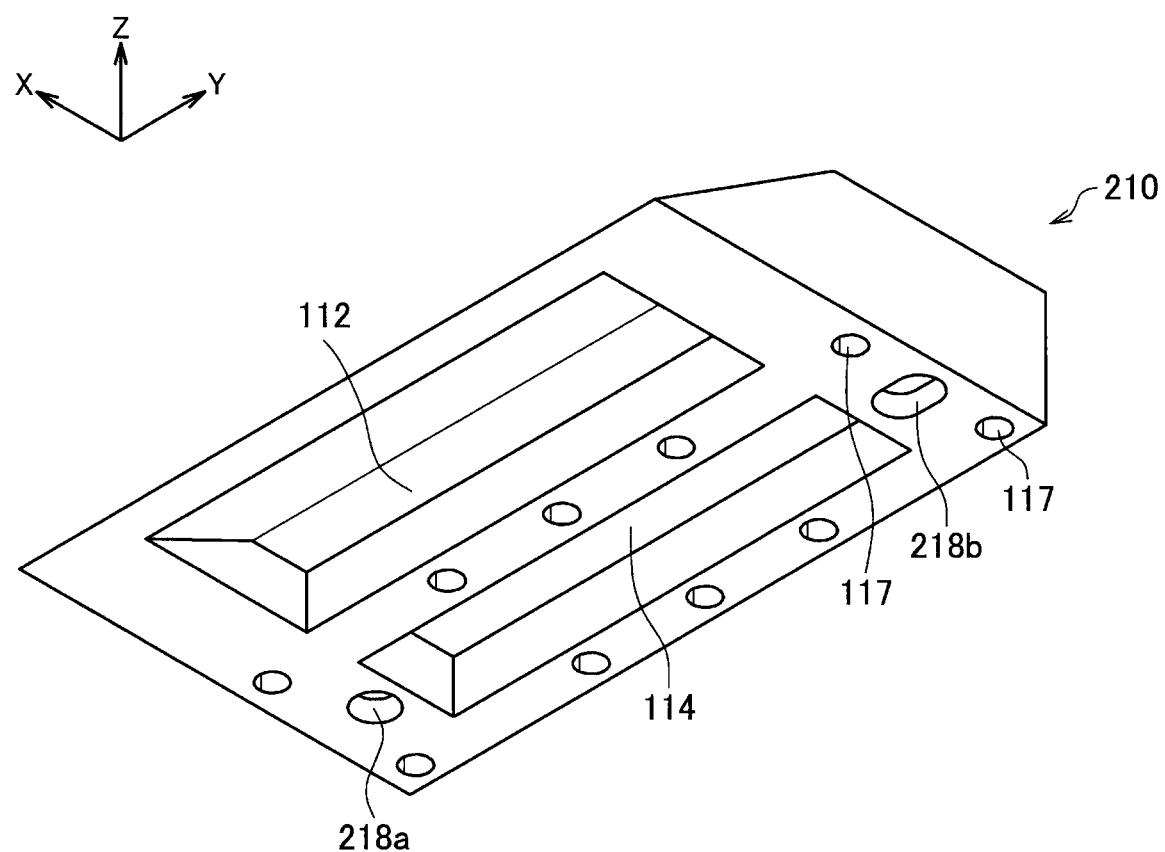
FIG. 12 is a perspective view showing one example of a top lip part according to the modification.
Figure 13:
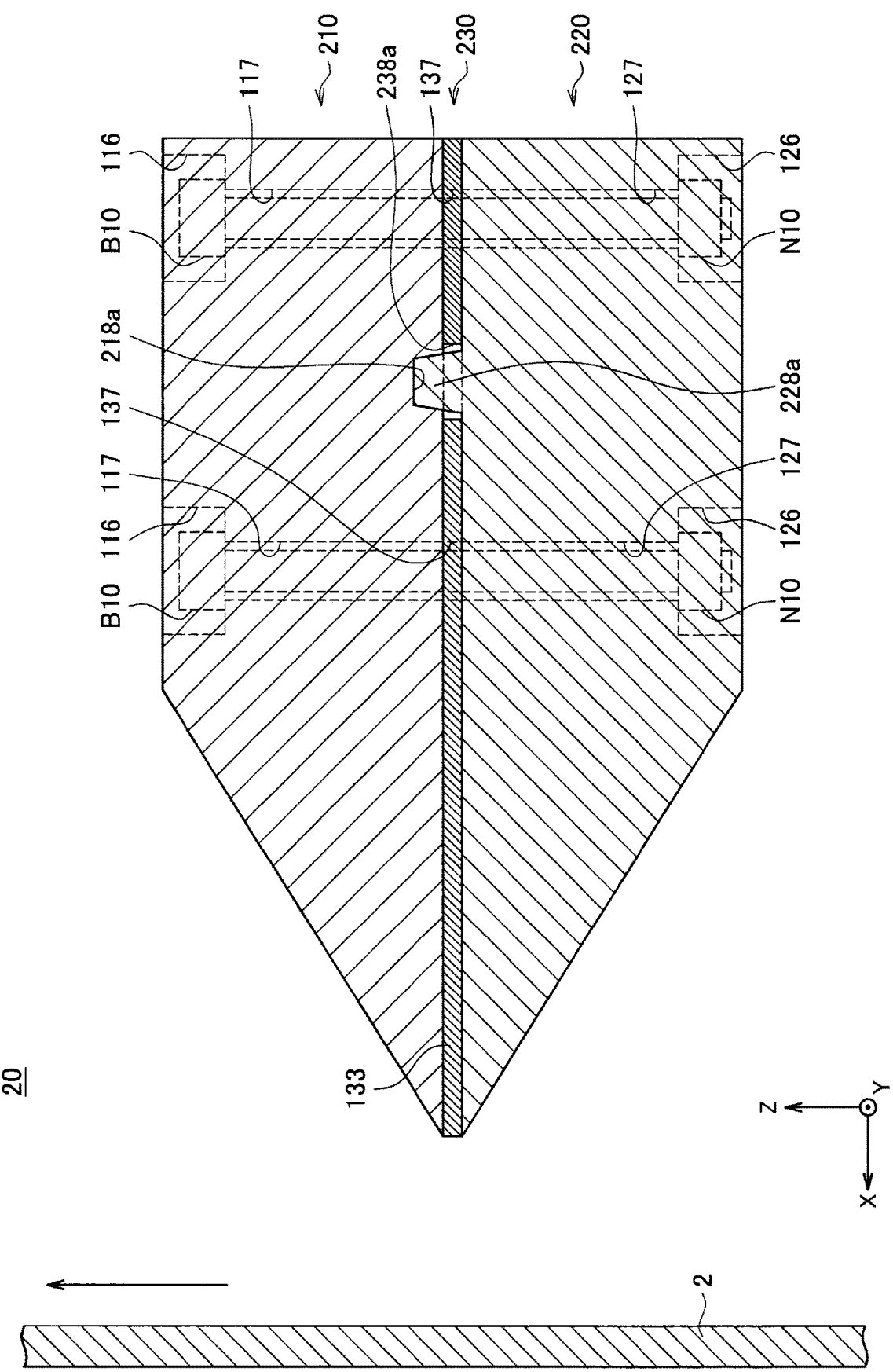
FIG. 13 is a cross-sectional view showing one example of the gas wiping nozzle according to the modification.

FIG. 10 is a perspective view showing one example of the gas wiping nozzle 20 according to the modification. FIG. 11 is a disassembled perspective view showing one example of the gas wiping nozzle 20 according to the modification. FIG. 12 is a perspective view showing one example of a top lip part 210 according to the modification. FIG. 13 is a cross-sectional view showing one example of the gas wiping nozzle 20 according to the modification. Specifically, FIG. 13 is a cross-sectional view of the B-B cross-section shown in FIG. 10. The B-B cross-section is a cross-section perpendicularly intersecting a width direction of the steel strip 2 and passing through the side extensions 133 of the shim 230.

In the gas wiping nozzle 20 according to the modification, compared with the above-mentioned gas wiping nozzle 10, there is the different point that the top lip part 210 is provided with fitting holes of the recessed parts while the bottom lip part 220 is provided with fitting projections of the projecting parts. Note that, in the modification, the above-mentioned pin insert hole 118a and pin insert hole 118b are omitted from the configuration of the top lip part 210, while the above-mentioned pin fastening hole 128a and pin fastening hole 128b are omitted from the configuration of the bottom lip part 220.

Specifically, in the modification, the bottom surface of the top lip part 210 (that is, the surface of the top lip part 210 at the bottom lip part 220 side), as shown in FIG. 12 and FIG. 13, is provided with a recessed part 218a and recessed part 218b used in the method for manufacturing a gas wiping nozzle 20 explained later. In the method for manufacture explained later, projecting parts provided at the bottom lip part 220 are fitted with the recessed part 218a and recessed part 218b. The recessed part 218a and recessed part 218b are provided at the bottom surface of the top lip part 210 separated by a distance in the width direction of the steel strip 2. Specifically, the recessed part 218a is provided alongside the sunken part 114 at one side of the width direction of the steel strip 2, while the recessed part 218b is provided alongside the sunken part 114 at the other side in the width direction of the steel strip 2. In the modification, the recessed part 218a and recessed part 218b correspond to examples of the fitting holes according to the present invention. Specifically, the recessed part 218a corresponds to one example of the first fitting hole according to the present invention, while the recessed part 218b corresponds to one example of the second fitting hole according to the present invention. Note that, details of the shapes and dimensions of the recessed part 218a and recessed part 218b will be explained later.

Further, in the modification, the top surface of the bottom lip part 220 (that is, the surface of the bottom lip part 220 at the top lip part 210 side), as shown in FIG. 11 and FIG. 13, is provided with a projecting part 228a and a projecting part 228b. The projecting part 228a and the projecting part 228b, specifically, are provided integrally with the bottom lip part 220. The projecting part 228a and the projecting part 228b are provided at the top surface of the bottom lip part 220 separated by a distance in the width direction of the steel strip 2 at positions corresponding to the recessed part 218a and recessed part 218b. Specifically, the projecting part 228a is provided alongside the sunken part 124 at one side of the width direction of the steel strip 2, while the projecting part 228b is provided alongside the sunken part 124 at the other side of the width direction of the steel strip 2. In the modification, the projecting part 228a and the projecting part 228b correspond to examples of the fitting projections according to the present invention. Specifically, the projecting part 228a corresponds to one example of the first fitting projection according to the present invention, while the projecting part 228b corresponds to one example of the second fitting projection according to the present invention. Note that, details of the shapes and dimensions of the projecting part 228a and the projecting part 228b will be explained later.

Further, in the modification, the shim 230, as shown in FIG. 11 and FIG. 13, is provided with a projecting part insert hole 238a and a projecting part insert hole 238b for avoiding interference with the projecting part 228a and the projecting part 228b provided at the bottom lip part 220 in the later explained method for manufacturing the gas wiping nozzle 20. For example, the projecting part insert hole 238a and the projecting part insert hole 238b are provided at the shim 230 at positions corresponding to the recessed part 218a and recessed part 218b running through the shim 230 in the vertical direction. Note that, details of the shapes and dimensions of the projecting part insert hole 238a and the projecting part insert hole 238b will be explained later.

Method for Manufacturing Gas Wiping Nozzle

Next, referring to FIG. 14 and FIG. 15, a method for manufacturing the gas wiping nozzle 20 according to the modification will be explained.

The method for manufacturing the gas wiping nozzle 20 according to the modification, for example, includes the shim attachment step, the fitting step, and the fastening step.

The shim attachment step is a step of attaching the shim 230 to the bottom lip part 220.

Figure 14:
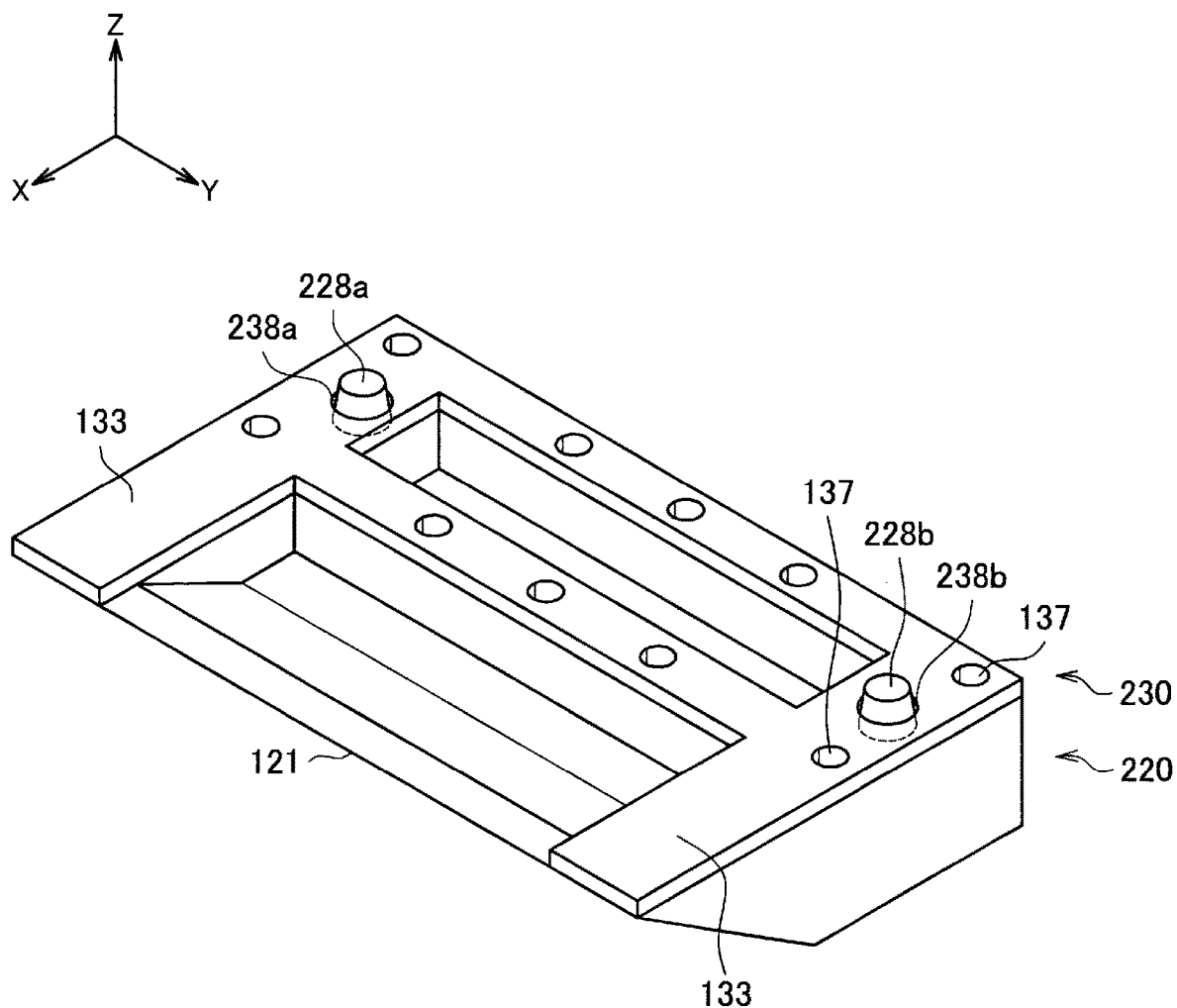
FIG. 14 is a perspective view showing the state of a shim attachment step in a method for manufacturing a gas wiping nozzle according to the modification.

FIG. 14 is a perspective view showing the state of the shim attachment step in the method for manufacturing a gas wiping nozzle 20 according to a modification.

For example, in the shim attachment step, the shim 230 is placed on the bottom lip part 220 from above so that the top end parts of the projecting part 228a and the projecting part 228b pass through the projecting part insert hole 238a and the projecting part insert hole 238b of the shim 230 from the bottom. Due to this, the shim 230, as shown in FIG. 14, is attached to the bottom lip part 220 in the state abutting against the portion of the front end part 121 of the bottom lip part 220 other than the center side in the width direction of the steel strip 2.

The projecting part 228a and the projecting part 228b, for example, have frustoconical shapes. In this way, the projecting part 228a and the projecting part 228b can have tapered shapes with cross-sectional areas becoming smaller the further toward the top parts. On the other hand, the projecting part insert hole 238a and the projecting part insert hole 238b of the shim 230, for example, are circular holes. The inside diameters of the projecting part insert hole 238a and the projecting part insert hole 238b specifically are set to relatively large dimensions of extents enabling interference of the shim 230 with the projecting part 228a and the projecting part 228b to be avoided.

Note that, the projecting part 228a and the projecting part 228b may also have shapes different from frustoconical shapes. For example, the projecting part 228a and the projecting part 228b may also have circular columnar shapes, polygonal columnar shapes, or polygonal frustoconical shapes. In this case, the projecting part insert hole 238a and the projecting part insert hole 238b of the shim 230 can have shapes corresponding to the projecting parts. In this way, the shapes and dimensions of the projecting part insert hole 238a and the projecting part insert hole 238b of the shim 230 are set in accordance with the shapes and dimensions of the projecting part 228a and the projecting part 228b.

The fitting step, as explained above, is a step fitting the fitting projections provided at one lip part with fitting holes provided at another lip part. Specifically, in the modification, in the fitting step, fitting projections of the projecting part 228a and the projecting part 228b at the bottom lip part 220 are fitted with fitting holes of the recessed part 218a and recessed part 218b at the top lip part 210.

Figure 15:
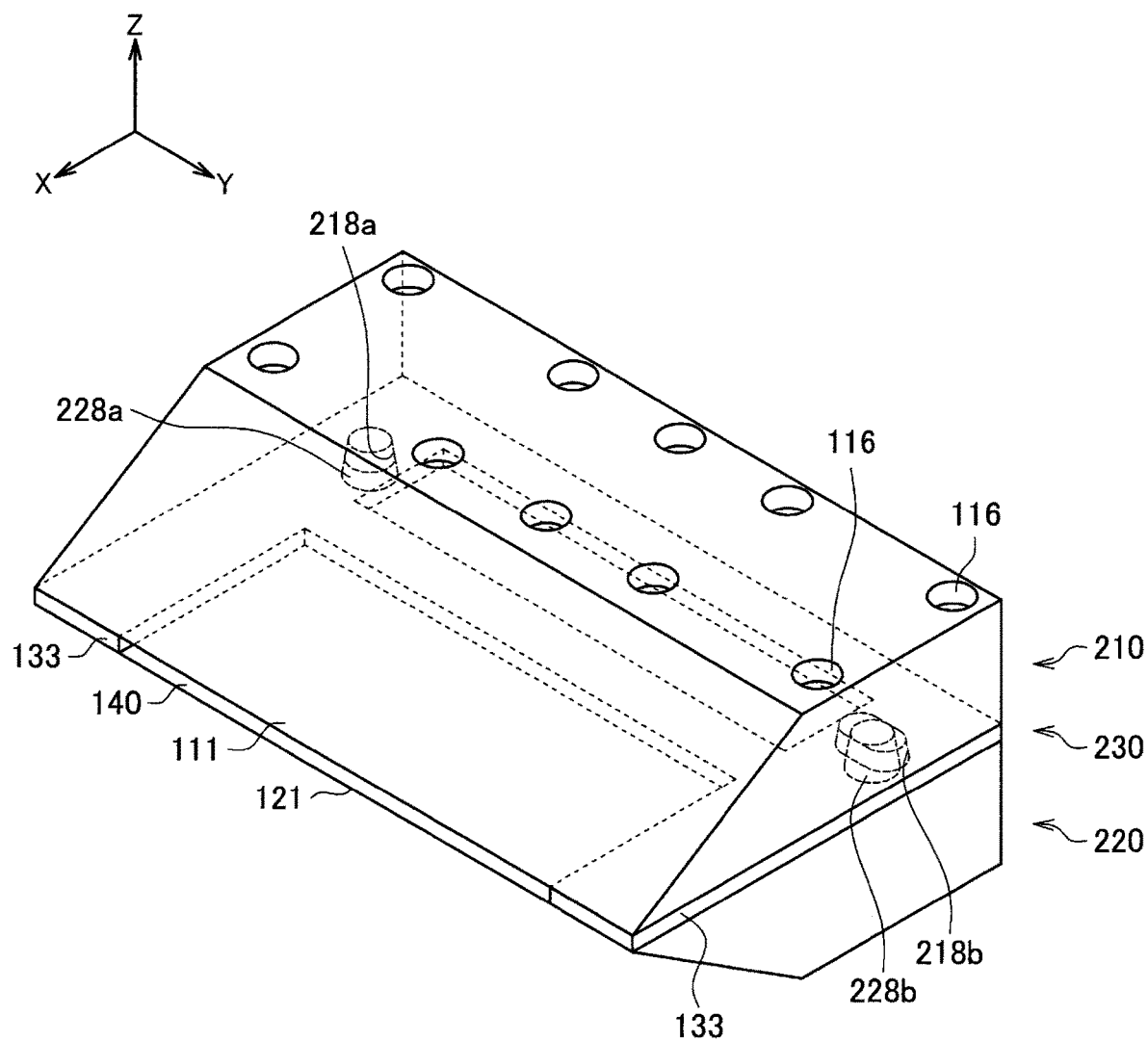
FIG. 15 is a perspective view showing the state of a fitting step in the method for manufacturing a gas wiping nozzle according to the modification.

FIG. 15 is a perspective view showing the state of the fitting step in the method for manufacturing a gas wiping nozzle 20 according to the modification.

For example, at the fitting step, the top lip part 210 is placed on the top part of the bottom lip part 220 from above so that the top parts of the projecting part 228a and the projecting part 228b are inserted into the recessed part 218a and recessed part 218b from the bottom. In this way, the projecting part 228a and the projecting part 228b are inserted into the recessed part 218a and recessed part 218b whereby, as shown in FIG. 15, they are fitted with the recessed part 218a and recessed part 218b. Due to this, it is possible to restrict relative movement between the top lip part 210 and the bottom lip part 220 in directions other than the vertical direction (Z-direction). Accordingly, in the fitted state where the fitting projections of the projecting part 228a and the projecting part 228b are fitted with the fitting holes of the recessed part 218a and recessed part 218b, it is possible to restrict relative movement between the top lip part 210 and the bottom lip part 220 in the thickness direction of the steel strip 2 (X-direction).

Note that, the projecting length of the projecting part 228a may be longer compared with the projecting length of the projecting part 228b. In this case, at the fitting step, the front end part of the projecting part 228a is inserted into the recessed part 218a, then the projecting part 228a and the projecting part 228b can be fitted with the respective recessed part 218a and recessed part 218b.

The shapes and dimensions of the recessed part 218a and recessed part 218b of the top lip part 210 are set according to the shapes and dimensions of the projecting part 228a and the projecting part 228b.

For example, the recessed part 218a of the top lip part 210 corresponding to one example of the first fitting hole according to the present invention is a round hole. Specifically, the recessed part 218a can have a tapered shape with a cross-sectional area becoming smaller the further toward the bottom part. By the projecting part 228a and recessed part 218a having circular cross-sectional shapes, in the state where the projecting part 228a is fitted with the recessed part 218a, the outer circumferential surface of the projecting part 228a and the inner circumferential surface of the recessed part 218a will abut against each other over their entireties. By the projecting part 228a being fitted with the recessed part 218a in this way, it is possible to realize positioning of the recessed part 218a provided at the top lip part 210 and the projecting part 228a provided at the bottom lip part 220 on the same axis.

If designating the distance between the recessed part 218a and the projecting part 228a in the thickness direction of the steel strip 2 as D, from the viewpoint of suitably restricting relative movement between the top lip part 210 and the bottom lip part 220 in the thickness direction of the steel strip 2 in the fitted state where the projecting part 228a and the projecting part 228b are fitted with the recessed part 218a and recessed part 218b, the distance D satisfies the above-mentioned formula (1). The dimension of the recessed part 218a may specifically be set so that the bottom surface of the top lip part 210 and the top surface of the bottom lip part 220 can abut against the shim 230 in the state where the outer circumferential surface of the projecting part 228a and the inner circumferential surface of the recessed part 218a abut against each other.

Further, for example, the recessed part 218b of the top lip part 210 corresponding to one example of the second fitting hole according to the present invention is an elongated hole extending along the width direction of the steel strip 2 and longer in the width direction of the steel strip 2 than the thickness direction of the steel strip 2. Specifically, the recessed part 218b can have a tapered shaped with a cross-section which becomes smaller the further toward the bottom part. For this reason, in the state where the projecting part 228b is fitted with the recessed part 218b, the outside surface of the projecting part 228b and the inside surface of the recessed part 218b abut against each other in the thickness direction of the steel strip 2. By the projecting part 228b being fitted with the recessed part 218b in this way, it is possible to realize restriction of relative rotation between the top lip part 210 and the bottom lip part 220 about the center axis of the projecting part 228a.

From the viewpoint of suitably restricting relative movement between the top lip part 210 and the bottom lip part 220 in the thickness direction of the steel strip 2 in the fitted state where the projecting part 228a and the projecting part 228b are fitted with the recessed part 218a and recessed part 218b, if designating the distance between the recessed part 218b and the projecting part 228b in the thickness direction of the steel strip 2 as D, the distance D satisfies the above-mentioned formula (1). Note that, the dimensions of the recessed part 218b specifically may be set so that the bottom surface of the top lip part 210 and the top surface of the bottom lip part 220 can abut against the shim 230 in the state where the outer circumferential surface of the projecting part 228b and the inner circumferential surface of the recessed part 218b abut in the thickness direction of the steel strip 2.

Here, at the fitting step, as explained above, the outer circumferential surface of the projecting part 228b and the inner circumferential surface of the recessed part 218b abut in the thickness direction of the steel strip 2 whereby relative rotation between the top lip part 210 and the bottom lip part 220 about the center axis of the projecting part 228a is restricted. For this reason, the length of the recessed part 218b in the width direction of the steel strip 2 basically does not affect the precision of relative positioning between the top lip part 210 and the bottom lip part 220.

If the length of the recessed part 218b in the width direction of the steel strip 2 is excessively short, for example, it can become difficult to insert the projecting part 228a and the projecting part 228b in the recessed part 218a and recessed part 218b at the time of assembly of the gas wiping nozzle 20 due to heat deformation or machining error etc. at the time of use at the gas wiping nozzle 20.

Further, at the time of use of the gas wiping nozzle 20, as explained above, the bottom lip part 220 is closer to the plating bath 3 than the top lip part 210, so becomes higher in temperature. For this reason, at the time of use of the gas wiping nozzle 20, a temperature difference arises between the top lip part 210 and the bottom lip part 220 and the amount of deformation due to heat expansion differs. Due to this, the projecting part 228b provided at the bottom lip part 220 can be pushed against the inside surface of the recessed part 218b provided at the top lip part 210.

For this reason, from the viewpoint of facilitating the assembly of the gas wiping nozzle 20 and the viewpoint of effectively keeping the projecting parts and recessed parts from being damaged due to the difference in amounts of deformation due to heat expansion between the lip parts at the time of use of the gas wiping nozzle 20, when designating the length of the recessed part 218b in the width direction of the steel strip 2 as L1, the length L1 preferably satisfies the above-mentioned formula (2). Further, from the viewpoint of improving the work efficiency in assembly of the gas wiping nozzle 20, the length L1 more preferably satisfies the above-mentioned formula (5). Note that, in the modification, the φ1 in the formula (2) and formula (5) shows the diameter of the projecting part 228b, while ΔT shows the temperature difference between the top lip part 210 and the bottom lip part 220.

Note that, in the above, an example where the recessed part 218a into which the projecting part 228a and the projecting part 228b is inserted have circular cross-sectional shapes was explained, but the projecting part 228b and the recessed part 218b into which the projecting part 228b is inserted may also have circular cross-sectional shapes. That is, the recessed part 218b may also be a round hole.

The fastening step, as explained above, is a step of fastening the pair of lip parts with each other in the fitted state where the fitting projection are fitted with the fitting holes. Specifically, in the modification, at the fastening step, the top lip part 210 and the bottom lip part 220 are fastened to each other in the fitted state where the fitting projections of the projecting part 228a and the projecting part 228b are fitted with the fitting holes of the recessed part 218a and recessed part 218b. The top lip part 210 and the bottom lip part 220 are, for example, fastened with each other using bolts B10 and nuts N10. Due to this, the gas wiping nozzle 20 shown in FIG. 10 is manufactured.

As explained above, the method for manufacturing the gas wiping nozzle 20 according to the modification includes the fitting step of fitting fitting projections provided at one lip part with fitting holes provided at another lip part and the fastening step of fastening the pair of lip parts together in the fitted state where the fitting projection are fitted with the fitting holes. Here, in the fitted state, relative movement between the pair of lip parts in the thickness direction of the steel strip 2 is restricted. Specifically, two pairs of fitting projections (specifically, projecting parts) and fitting holes (specifically, recessed parts) are provided separated by a distance in the width direction of the steel strip 2. Accordingly, in the fitted state, it is possible to realize restriction of relative movement between the pair of lip parts in the thickness direction of the steel strip 2. Further, in the fitted state, the distance D between the fitting projections and fitting holes in the thickness direction of the steel strip 2 satisfies formula (1). Due to this, it is possible to suitably restrict relative movement between the pair of lip parts in the thickness direction of the steel strip 2 in the fitted state. Accordingly, in the same way as the above-mentioned method for manufacturing the gas wiping nozzle 10, it is possible to keep the relative positional relationship between the pair of lip parts in the thickness direction of the steel strip 2 from varying due to assembly of the gas wiping nozzle 20. For this reason, it is possible to keep the pressure of the gas striking the steel strip 2 from varying, so it is possible to stabilize the coating weight of the molten metal on the steel strip 2.

Further, as explained above, in the modification, the fitting projections can include projecting parts provided at the surface of one lip part at the other lip part side while the fitting holes can include recessed parts provided at the surface of the other lip part at the one lip part side. Further, at the fitting step, the projecting parts can be fitted with the recessed parts by insertion in them. Due to this, relative movement between the pair of lip parts in the direction intersecting the direction where the pair of lip parts face each other can be effectively restricted. For this reason, at the fitted state, relative movement between the pair of lip parts in the thickness direction of the steel strip 2 can be effectively restricted.

Further, as explained above, in the modification, the projecting parts can have tapered shapes with cross-sectional areas becoming smaller the further toward the top parts, while the recessed parts can be tapered shapes with cross-sectional areas becoming smaller the further toward the bottom parts. Due to this, in fitting step, even if the projecting parts are inserted in the recessed parts in the state with the center axes of the projecting parts and the center axes of the recessed parts not positioned coaxially, the projecting parts can proceed to be inserted into the recessed parts while the outer circumferential surfaces of the projecting parts and the inner circumferential surfaces of the recessed parts slide with respect to each other. For this reason, the projecting parts can be smoothly fitted with the recessed parts.

In the above, an example where the projecting part 228a and the projecting part 228b were provided integrally with the bottom lip part 220 was explained, but the projecting parts used as the fitting projections may also be provided separate from the bottom lip part.

FIG. 16 is a cross-sectional view showing an example of the gas wiping nozzle 30 according to another modification. Specifically, FIG. 16 is a cross-sectional view of the cross-section perpendicularly intersecting the width direction of the steel strip 2 and passing through the side extensions 133 of the shim 230 in the gas wiping nozzle 30.

In a gas wiping nozzle 30 according to the other modification, compared with the above-mentioned gas wiping nozzle 20, there is the difference that the projecting parts are provided at the bottom lip part 320 as separate parts.

In the gas wiping nozzle 30, in the same way as the above-mentioned gas wiping nozzle 20, a pair of the projecting parts are provided at the top part of the bottom lip part 320 at positions corresponding to the recessed part 218a and recessed part 218b. Note that, in FIG. 16, among such a pair of the projecting parts, the projecting part 328a corresponding to the recessed part 218a is illustrated, but illustration of the projecting part corresponding to the recessed part 218b is omitted.

In the gas wiping nozzle 30, for example, a pair of sunken parts are provided at positions corresponding to the recessed part 218a and recessed part 218b at corresponding positions at the top part of the bottom lip part 320. Note that, in FIG. 16, among such a pair of sunken parts, the sunken part 329a corresponding to the recessed part 218a is illustrated. Illustration of the sunken part corresponding to the recessed part 218b is omitted. The pair of the projecting parts are fastened in the state fitted with the pair of sunken parts. For example, the projecting part 328a corresponding to the recessed part 218a, as shown in FIG. 16, is fastened in the state fitted with the sunken part 329a.

In this way, even if the projecting parts are provided at the bottom lip part as separate members, in the same way as when the projecting parts are integrally provided at the bottom lip part, it is possible to restrict relative movement between the pair of lip parts in the thickness direction of the steel strip 2 in the fitted state where the pair of the projecting parts are fitted with the pair of recessed parts.

5. Conclusion

As explained above, the method for manufacturing the gas wiping nozzle 10 according to the present embodiment includes the fitting step of fitting fitting projections provided at one lip part with fitting holes provided at another lip part and the fastening step fastening the pair of lip parts with each other in the fitted state where the fitting projections are fitted with the fitting holes. Here, in the fitted state, relative movement between the pair of lip parts in the thickness direction of the steel strip 2 is restricted. Specifically, two pairs of the fitting projections and fitting holes are provided separated by a distance in the width direction of the steel strip 2 (total of two pairs each comprised of pair of fitting projections and fitting holes). Due to this, it is possible to realize restriction of relative movement between the pair of lip parts in the thickness direction of the steel strip 2 in the fitted state. Further, in the fitted state, the distance D between the fitting projections and the fitting holes in the thickness direction of the steel strip 2 satisfies formula (1). Due to this, it is possible to suitably restrict relative movement between the pair of lip parts in the thickness direction of the steel strip 2 in the fitted state. Accordingly, it is possible to keep the relative positional relationship between the pair of lip parts in the thickness direction of the steel strip 2 from varying due to assembly of the gas wiping nozzle 10. For this reason, it is possible to keep the pressure of the gas striking the steel strip 2 from varying, so it is possible to stabilize the coating weight of the molten metal on the steel strip 2.

Note that, in the above, an example where the nozzle chamber 191 and gas header chamber 192 were respectively formed at the front end side and the back end side at the gas wiping nozzle 10 were explained, but the gas header chamber 192 may also be omitted from the configuration of the gas wiping nozzle 10. Note that, in this case, the communication holes 113 and communication holes 123 communicating the nozzle chamber 191 and the gas header chamber 192 are omitted from the configuration of the top lip part 110 and the bottom lip part 120.

Further, in the above, an example where a pair of pins were provided at the bottom lip part as the fitting projections and an example where a pair of projecting parts were provided at the bottom lip part as the fitting projections were mainly explained, the bottom lip part may be provided with a mixture of pins and projecting parts as the fitting projections. In this case, the top lip part is provided with pin insert holes as fitting holes at positions corresponding to the pins and is provided with recessed parts as fitting holes at positions corresponding to the projecting parts.

Further, in the above, an example where fitting projections of pins were provided at the bottom lip part and an example where fitting projections of projecting parts were provided at the bottom lip part were mainly explained, but the fitting projections of the pins or projecting parts may also be provided at the top lip part. If fitting projections of pins are provided at the top lip part, the bottom lip part is provided with fitting holes of the pin insert holes at positions corresponding to the pins provided at the top lip part. Further, if the top lip part is provided with fitting projections as projecting parts, the bottom lip part is provided with fitting holes of recessed parts at positions corresponding to the projecting parts provided at the top lip part.

Further, in the above, an example where relative movement between the pair of lip parts in directions other than the direction where the pair of lip parts face each other was restricted in the fitted state was mainly explained, but the direction of relative movement between the pair of lip parts restricted in the fitted state may also be only the thickness direction of the steel strip 2. For example, both of the pin insert hole 118a and pin insert hole 118b at the gas wiping nozzle 10 may be made elongated holes longer in the width direction of the steel strip 2 than the thickness direction of the steel strip 2. In such a case, in the fitted state, relative movement between the pair of lip parts in the width direction of the steel strip 2 cannot be restricted, but relative movement between the pair of lip parts in the thickness direction of the steel strip 2 can be restricted.

Further, in the above, an example where relative movement between the pair of lip parts in the thickness direction of the steel strip 2 in the fitted state is restricted in two directions was mainly explained, but relative movement between the pair of lip parts in the thickness direction of the steel strip 2 in the fitted state may also be restricted in only one direction. For example, a fitted state where only the surfaces of the fitting projections provided at the bottom lip part at the steel strip 2 side abut against the inner circumferential surfaces of the fitting holes provided at the top lip part may be considered. In this case, in relative movement between the pair of lip parts in the thickness direction of the steel strip 2, just movement of the top lip part with respect to the bottom lip part relatively in a direction away from the steel strip 2 is restricted. Even in such a case, by fastening the pair of lip parts with each other in the fitted state, it is possible to keep the relative positional relationship between the pair of lip parts in the thickness direction of the steel strip 2 from varying due to assembly of the gas wiping nozzle.

Further, in the above, the example where the top lip part 110 and the bottom lip part 120 were fastened by being screwed together was explained, but the top lip part 110 and the bottom lip part 120 may also be fastened by another method so long as detachment is possible.

Above, preferred embodiments of the present invention were explained in detail with reference to the drawings, but the present invention is not limited to these embodiments. It is clear that a person having ordinary skill in the field of art to which the present invention belongs could make various changes or corrections within the scope of the technical idea described in the claims. These will also naturally be understood as falling in the technical scope of the present invention.

REFERENCE SIGNS LIST 1 continuous hot dip metal plating apparatus
2 steel strip
3 plating bath
4 plating tank
5 snout
6 sink roll
7, 8 support rolls
9 top roll
10, 20, 30 gas wiping nozzle
110, 210 top lip part
118a, 118b pin insert hole
120, 220, 320 bottom lip part
128a, 128b pin fastening hole
130, 230 shim
138a, 138b pin insert hole
140 slit
151, 152 pin
191 nozzle chamber
192 gas header chamber
218a, 218b recessed part
228a, 228b, 328a projecting part
238a, 238b projecting part insert hole

The invention claimed is:
1. A method for manufacturing a gas wiping nozzle provided with a pair of lip parts facing each other and a slit formed as a gas ejection port between the pair of lip parts and blowing a gas from said slit against a steel strip pulled up from a molten metal plating bath so as to adjust a thickness of a molten metal film deposited on a surface of said steel strip, the method comprising:

a fitting step of fitting fitting projections fastened to one lip part of the pair of lip parts with fitting holes provided at an other lip part of the pair of lip parts and a fastening step of fastening said pair of lip parts together in the fitted state where said fitting projections are fitted with said fitting holes, wherein two pairs of said fitting projections and said fitting holes provided separated by a distance in a width direction of said steel strip, relative movement between said pair of lip parts in a thickness direction of said steel strip restricted in said fitted state, the distance between said fitting projections and said fitting holes in the thickness direction of said steel strip satisfying the following formula (1):

wherein said fitting projections include a first fitting projection and second fitting projection, said fitting holes include a first fitting hole and second fitting hole in which said first fitting projection and said second fitting projection are fitted, said first fitting projection and said second fitting projection have circular cross-sectional shapes, said first fitting hole is a round hole, and said second fitting hole is an elongated hole longer in a width direction of said steel strip than the thickness direction of said steel strip, $$D \leq 0.25 \times B \quad (1)$$

where

D: distance between said fitting projections and said fitting holes in the thickness direction of said steel strip [mm], and B: slit gap of said slit [mm].

2. The method for manufacturing a gas wiping nozzle according to claim 1, wherein said fitting projections include pins attached to pin fastening holes provided running through said one lip part in a direction at which said pair of lip parts face each other, and said fitting holes include pin insert holes provided running through said other lip part in a direction at which said pair of lip parts face each other.

3. The method for manufacturing a gas wiping nozzle according to claim 2, wherein the material of said pins and the material of said pair of lip parts are the same.

4. The method for manufacturing a gas wiping nozzle according to claim 1, wherein said fitting projections includes projecting parts provided in a surface of said one lip part at said other lip part side, and said fitting holes include recessed parts provided at a surface of said other lip part at said one lip part side.

5. The method for manufacturing a gas wiping nozzle according to claim 4, wherein said projecting parts have tapered shapes with cross-sections becoming smaller the further toward a top part of the projecting parts, and said recessed parts have tapered shapes with cross-sections becoming smaller the further toward a bottom part of the recessed parts.

6. The method for manufacturing a gas wiping nozzle according to claim 1, wherein a length of said second fitting hole in the width direction of said steel strip satisfies the following formula (2):

$$L1 \geq \varphi 1 + 20 \times 10^{-6} \times \Delta T \times W \quad (2)$$

where

L1: length of said second fitting hole in the width direction of said steel strip [mm]

$\varphi 1$: diameter of said second fitting projection [mm]

$\Delta T$: temperature difference between said one lip part and said other lip part [K]

W: length of said pair of lip parts in the width direction of said steel strip [mm].

7. The method for manufacturing a gas wiping nozzle according to claim 1, wherein a projecting length of said first fitting projection is longer compared with a projecting length of said second fitting projection, and in said fitting step, a front end part of said first fitting projection is inserted into said first fitting hole, then said first fitting projection and said second fitting projection are fitted with said first fitting hole and said second fitting hole respectively.

\* \* \* \* \*